US008678386B2

(12) United States Patent
Hata

(10) Patent No.: US 8,678,386 B2
(45) Date of Patent: Mar. 25, 2014

(54) IMAGE FORMING APPARATUS AND POWER TRANSMISSION MECHANISM

(75) Inventor: Masaki Hata, Nagoya (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 0 days.

(21) Appl. No.: 13/544,825

(22) Filed: Jul. 9, 2012

(65) Prior Publication Data

US 2013/0015622 A1    Jan. 17, 2013

(30) Foreign Application Priority Data

Jul. 15, 2011  (JP) ................................ 2011-156525

(51) Int. Cl.
*B65H 5/00* (2006.01)
*G03G 21/00* (2006.01)
*F16D 11/04* (2006.01)

(52) U.S. Cl.
CPC ..................................... *F16D 11/04* (2013.01)
USPC ......................... 271/272; 399/124; 271/10.13

(58) Field of Classification Search
USPC .................... 271/10.13, 10.14, 162; 399/124
See application file for complete search history.

(56) References Cited

U.S. PATENT DOCUMENTS

| 4,976,557 | A  * | 12/1990 | Uchikata ........................ 400/565 |
| 6,742,641 | B2 * | 6/2004  | Takasaka ...................... 192/48.9  |
| 7,306,216 | B2 * | 12/2007 | Lee et al. ..................... 271/10.01 |
| 7,549,627 | B2 * | 6/2009  | Lin et al. ..................... 271/10.13 |
| 8,366,097 | B2 * | 2/2013  | Tu et al. ...................... 271/10.13 |
| 2007/0140772 | A1 * | 6/2007 | Barinaga ..................... 400/636.2 |
| 2008/0012200 | A1 * | 1/2008 | Lin et al. .................... 271/10.13 |
| 2011/0198181 | A1 * | 8/2011 | Tu et al. ........................ 192/20 |

FOREIGN PATENT DOCUMENTS

| JP | 2000-221863 | 8/2000 |
| JP | 2006-214567 | 8/2006 |
| JP | 2011-7295   | 1/2011 |

OTHER PUBLICATIONS

Notification of Reasons for Refusal mailed Oct. 15, 2013, directed to JP Application No. 2011-156525; 6 pages.

* cited by examiner

*Primary Examiner* — Kaitlin Joerger
(74) *Attorney, Agent, or Firm* — Morrison & Foerster LLP

(57) ABSTRACT

Image forming apparatus having sheet transport device transporting sheet through nip between pressing and drive members by applying rotational force to drive member via power transmission mechanism that includes: first and second rotational shafts connected to drive member and drive source, respectively; first and second rotation transmitting members attached to first and second rotational shafts, respectively; holding member including first and second contact parts disposed on opposite sides of second rotation transmitting member; and rotational move member switching to power non-transmission and transmission states by moving holding member rotationally to first and second positions in conjunction with opening and closing operations of opening/closing member of apparatus housing. Power is not transmitted between rotational shafts in power non-transmission state and transmitted in power transmission state. Rotational move member moves holding member causing contact parts to move second rotation transmitting member toward first and second directions, respectively.

16 Claims, 14 Drawing Sheets

IMAGE FORMING APPARATUS AND POWER TRANSMISSION MECHANISM

This application is based on application No. 2011-156525 filed in Japan, the contents of which are hereby incorporated by reference.

BACKGROUND OF THE INVENTION (1) Field of the Invention

The present invention relates to an image forming apparatus and a power transmission mechanism that is suitably used in the image forming apparatus.

(2) Description of the Related Art

An image forming apparatus such as a copier, a printer, a fax machine, or a complex machine of these machines has a typical structure where a recording sheet is fed from a paper feeder and transported along a transport path, a toner image corresponding to image data is transferred onto the recording sheet, and the toner image on the recording sheet is fixed onto the recording sheet by a fixing unit.

In general, the recording sheet is transported through the transport path by a sheet transport device using a pair of rotational members such as rollers and belts. In the sheet transport device, for example, a nip is formed between a pair of rollers that are pressed against each other. One of the rollers is connected, via a power transmission system, to a motor as a drive source. One of the rollers is driven to rotate by a power transmitted from the motor, then the other roller rotates following the rotation of the rotating roller.

In the nip, the recording sheet is transported in the state of being clamped between the pair of rotating rollers.

In such a sheet transport device, if the transported recording sheet is stuck in the nip and a paper jam occurs, it is necessary to remove the recording sheet from the nip by pulling off the sheet. In that case, since one of the pair of rollers is connected to the motor as a drive source, to pull off the recording sheet, a force larger than the torque of the roller is necessary.

However, when the force that pulls the recording sheet is larger than the strength of the recording sheet, the recording sheet may not be pulled from the nip and may be torn apart. Fragments of the recording sheet then remain stuck in the nip. If a small fragment of the recording sheet is stuck in the nip, it is difficult to remove the fragment from the nip.

Also, in the fixing unit, while the recording sheet passes through the fixing nip formed by a pair of rotational members, the recording sheet is heated and pressed so that the toner image thereon is fixed onto the recording sheet. In such a fixing unit, to fix the toner image onto the recording sheet, it is necessary to apply a high pressure to the recording sheet in the fixing nip. Thus, if a recording sheet is stuck in the fixing nip and a paper jam occurs, a large pulling force is necessary to pull off the recording sheet from the fixing nip. This increases the possibility that the recording sheet is torn apart.

Patent Literature 1 (Japanese Patent Application Publication No. 2006-214567) discloses a structure in which a coupling, which is provided in a drive transmission system (power transmission mechanism) for transmitting a drive force to a roller to transport a recording sheet (sheet), is caused to get into a power non-transmission state by a connection release member (connection release lever). The coupling is provided in a slidable manner and gets into a power transmission state when it is caused to engage with an idle gear by an urging force from a coil spring. The connection release lever moves in conjunction with the opening/closing operation of the opening/closing door, wherein the sheet transport path is exposed to outside when the opening/closing door is open. When the opening/closing door is open, the coupling is caused to slide resisting the urging force from the coil spring, and the coupling comes out of the engaging state with the idle gear and gets into the power non-transmission state.

According to the structure of Patent Literature 1, the power transmission state is generated by causing the coupling to engage with the idle gear by the urging force from the coil spring. Thus, a large frictional force is applied to between the coupling and the idle gear, and the coupling or the idle gear is likely to wear with time.

According to the structure of Patent Literature 1, to release the engagement between the coupling and the idle gear, a relatively small power is used to move the connection release lever. However, even with this structure, when an attempt is made to release the engagement between the coupling and the idle gear, both the urging force from the coil spring and the pressure from the connection release lever are applied to the coupling. This may slant or distort the slidable coupling relative to the drive shaft.

When it happens, the coupling becomes difficult to slide smoothly relative to the drive shaft. Also, since the coupling receives a large pressure, the coupling may be deformed. In that case, the coupling may not be able to engage with the idle gear smoothly, and switching between transmission and non-transmission of power may not be conducted stably for a long time period in the power transmission system.

SUMMARY OF THE INVENTION

It is therefore an object of the present invention to provide an image forming apparatus equipped with a sheet transport device that can perform switching between transmission and non-transmission of power for a long time period stably, the power being transmitted to a rotational member that is used to transport a sheet. It is another object of the present invention to provide a power transmission mechanism that can be used suitably in the image forming apparatus.

The object is fulfilled by an image forming apparatus comprising a sheet transport device that transports a sheet through a nip, which is formed between a pressing member and a drive member, by applying a rotational force to the drive member via a power transmission mechanism, the power transmission mechanism including: a first rotational shaft connected to the drive member; a second rotational shaft connected to a drive source; a first rotation transmitting member attached to one of the first rotational shaft and the second rotational shaft; a second rotation transmitting member attached to the other of the first rotational shaft and the second rotational shaft; a holding member including a first contact part and a second contact part that are disposed on opposite sides of the second rotation transmitting member along an axial direction of the second rotation transmitting member, sandwiching the second rotation transmitting member loosely from both of the sides; and a rotational move member configured to switch to a power non-transmission state by moving the holding member rotationally to a first position in conjunction with an opening operation of an opening/closing member of an apparatus housing, and switch to a power transmission state by moving the holding member rotationally to a second position in conjunction with a closing operation of the opening/closing member, the power non-transmission state being a state in which power is not transmitted between the first rotational shaft and the second rotational shaft, and the power transmission state being a state in which power is transmitted between the first rotational shaft and the second rotational shaft, the rotational move member moving the holding member rotationally to the first position by causing the first contact part to contact and move the second rotation transmitting member toward a first direction, and moving the holding member rotationally to the second position by causing the second contact part to contact and move the second rotation transmitting member toward a second direction.

The object is also fulfilled by a power transmission mechanism comprising: a first rotational shaft connected to the drive member; a second rotational shaft connected to a drive source; a first rotation transmitting member attached to one of the first rotational shaft and the second rotational shaft; a second rotation transmitting member attached to the other of the first rotational shaft and the second rotational shaft; a holding member including a first contact part and a second contact part that are disposed on opposite sides of the second rotation transmitting member along an axial direction of the second rotation transmitting member, sandwiching the second rotation transmitting member loosely from both of the sides; and a rotational move member configured to switch between a power transmission state in which power is transmitted between the first rotational shaft and the second rotational shaft, and a power non-transmission state in which power is not transmitted between the first rotational shaft and the second rotational shaft, by moving the holding member rotationally and causing one of the first contact part and the second contact part to contact and move the second rotation transmitting member to a first position or to a second position.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings.

DESCRIPTION OF EMBODIMENTS

The following describes embodiments of an image forming apparatus of the present invention.

<Structure of Image Forming Apparatus>

Figure 1:
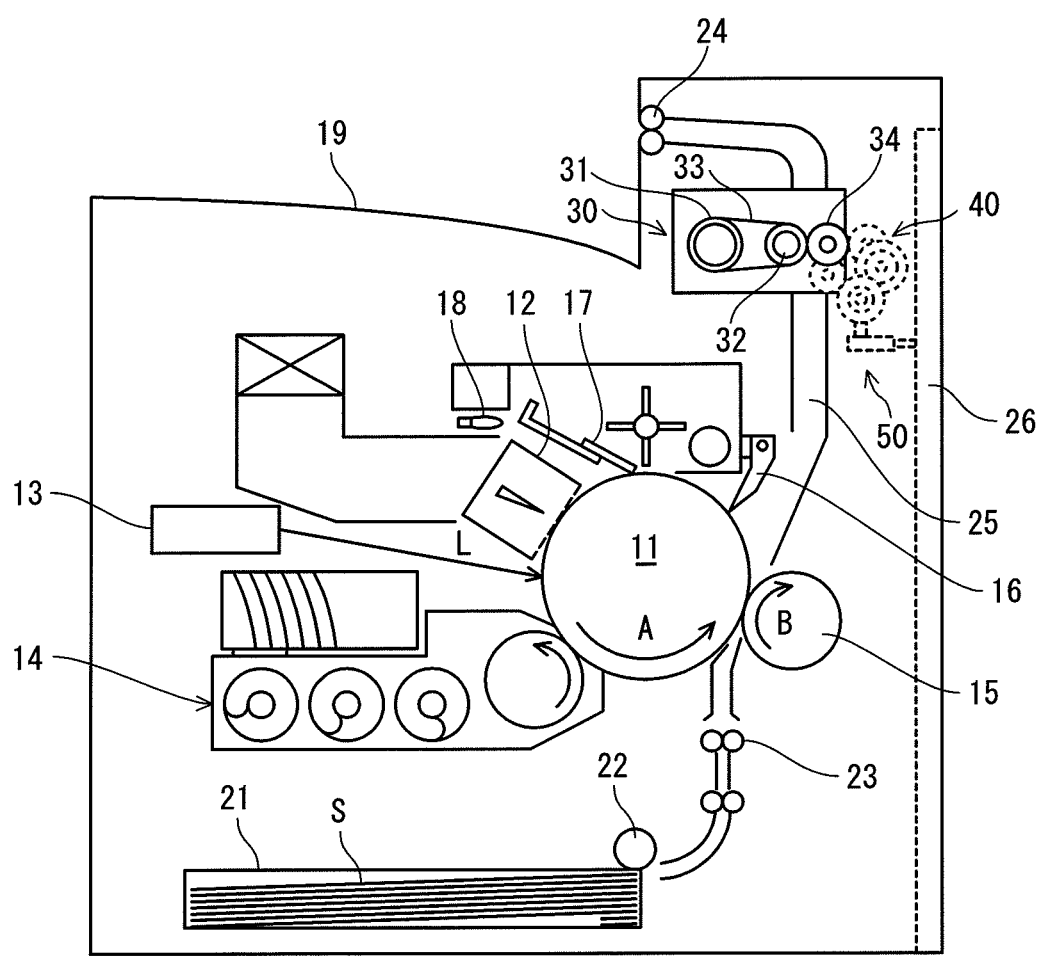
FIG. 1 is a schematic diagram illustrating an overall structure of a printer including a sheet transport device described as an embodiment of the present invention.

FIG. 1 is a schematic diagram illustrating the structure of a printer viewing from the front side, as one example of the image forming apparatus in an embodiment of the present invention. This printer forms a monochrome toner image on a recording sheet such as a sheet of recording paper or an OHP sheet.

The image forming apparatus illustrated in FIG. 1 includes a photosensitive drum 11 which is driven to rotate in a direction indicated by an arrow A. The image forming apparatus also includes a charging device 12, an exposure device 13, a developing device 14, and a transfer roller 15 that are provided to form a toner image on a recording sheet S by the electrophotographic method and are provided around the photosensitive drum 11 in the stated order in the rotational direction of the photosensitive drum 11. The photosensitive drum 11 is disposed to extend horizontally from the front side to the back side of the image forming apparatus.

Note that in the following description, the right side and the left side when viewed from the front side toward the back side are merely referred to as the right side and the left side, respectively.

In this printer, image data input from an external device is converted, by a controller (not illustrated), into a drive signal for driving a laser diode, and the drive signal drives the laser diode provided in the exposure device 13. This causes the exposure device 13 to radiate a laser beam L for the input image data onto the surface of the photosensitive drum 11. The surface of the photosensitive drum 11 has been electrically charged to a predetermined potential in advance by the charging device 12. When the surface of the photosensitive drum 11 is exposed to the laser beam L radiated by the exposure device 13, an electrostatic latent image is formed thereon. This electrostatic latent image is developed by the developing device 14 with toner and a toner image, which is visual, is formed.

A recording sheet cassette 21 is provided below the photosensitive drum 11. The recording sheet cassette 21 can house a plurality of recording sheets S, which are, for example, sheets of recording paper or OHP sheets. The recording sheets S in the recording sheet cassette 21 are fed out one by one by a paper feed roller 22. The recording sheet S fed out from the recording sheet cassette 21 is transported to the photosensitive drum 11 via a pair of timing rollers 23.

Located on a side of the surface of the photosensitive drum 11, a transfer roller 15 is provided in the state of being pressed against the surface of the photosensitive drum 11 and of being rotatable in a direction indicated by an arrow B. The recording sheet S passes through a transfer nip that is formed between the transfer roller 15 and the photosensitive drum 11 that are pressing each other. When the recording sheet S passes through the transfer nip, the toner image formed on the photosensitive drum 11 is transferred onto the recording sheet S by the action of a transfer electric field that is generated by the application of a transfer voltage to the transfer roller 15. The recording sheet S with the transferred toner image thereon is removed from the photosensitive drum 11 by a separator 16, and is transported to a fixing unit 30 through a transport path 25.

The fixing unit 30 includes a heating roller 31, a fixing roller 32, a fixing belt 33 and a pressing roller 34. The heating roller 31 and the fixing roller 32 are arranged to align horizontally. The fixing belt 33 is wound around the heating roller 31 and the fixing roller 32, and moves in a circulating motion. The pressing roller 34 is arranged to face, and align horizontally with, the fixing roller 32 via the fixing belt 33 therebetween. The heating roller 31 has a heater lamp (not illustrated) inside. The heater lamp heats the fixing belt 33 wound around the heating roller 31.

The fixing belt 33 and the pressing roller 34 are housed in a housing 35 along the front side and the back side in the state of being pressed against each other. The pressed portions of the fixing belt 33 and the pressing roller 34 form a fixing nip through which the recording sheet S with the toner image transferred thereon passes. The recording sheet S is transported through the fixing nip by the rotation of the pressing roller 34 in the state of being pressed by the fixing belt 33.

When the recording sheet S with the toner image transferred thereon is transported and reaches the fixing nip, the recording sheet S is transported by a sheet transport device, which includes the fixing unit 30, to pass through the fixing nip. In the fixing nip, the recording sheet S is transported in the state of being clamped between the pressing roller (driving member) 34, which is driven to rotate, and the fixing belt 33 that moves in a circulating motion following the rotation of the pressing roller 34. Also, while passing through the fixing nip, the recording sheet S is heated to a predetermined temperature by the fixing belt 33 that is heated by the heater lamp, and is pressed by the fixing belt 33 and the pressing roller 34. This causes the toner image on the recording sheet S to be fixed onto the recording sheet S.

A drive unit 40 (see FIGS. 4 through 7) is provided on the back side of the image forming apparatus such that the pressing roller 34 is driven to rotate when the fixing unit 30 and the drive unit 40 get into a power transmission state in which the power is transmitted therebetween via a power transmission mechanism 50 (see FIGS. 4 through 7). This causes the fixing belt 33, pressed against the pressing roller 34, to move in a circulating motion following the rotation of the pressing roller 34 and transport the recording sheet S having entered the fixing nip.

As described above, the fixing unit 30, the drive unit 40 and the power transmission mechanism 50 constitute the sheet transport device that transports the recording sheet S.

After it passes through the fixing nip, the recording sheet S is transported by the fixing belt 33 and the pressing roller 34 to a paper-eject roller 24, and ejected onto a paper tray 19 by the paper-eject roller 24.

An opening/closing door (opening/closing member) 26 is provided in a side face on the right side (a side face closer to the fixing unit 30) of a housing of the image forming apparatus. The opening/closing door 26 moves around an axis forward and backward (rightward and leftward in FIG. 1) to render the side face of the right side of the image forming apparatus open or closed. When the opening/closing door 26, namely, the side face of the right side of the apparatus housing is closed, the opening/closing door 26 covers the fixing unit 30, the transport path 25, through which the recording sheet S is transported to the fixing unit 30, and the like; and when the side face of the right side of the apparatus housing is open, the fixing unit 30, the inside of the transport path 25 and the like are exposed to the outside.

<Structure of Sheet Transport Device>

Figure 2:
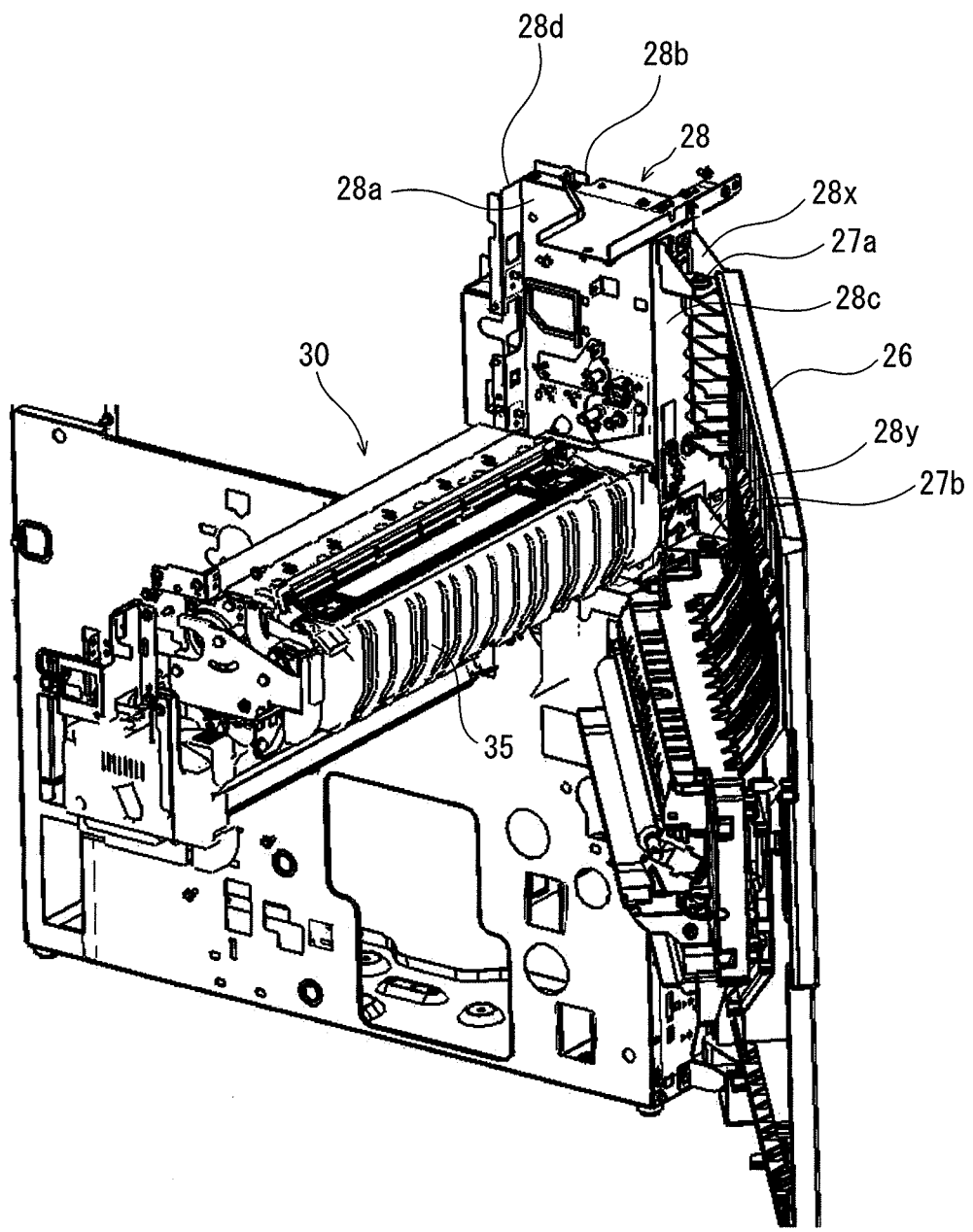
FIG. 2 is a perspective view of main parts for the explanation of the relationship between the opening/closing door (opening/closing member) and the fixing unit in the sheet transport device provided in the printer illustrated in FIG. 1.
Figure 3:
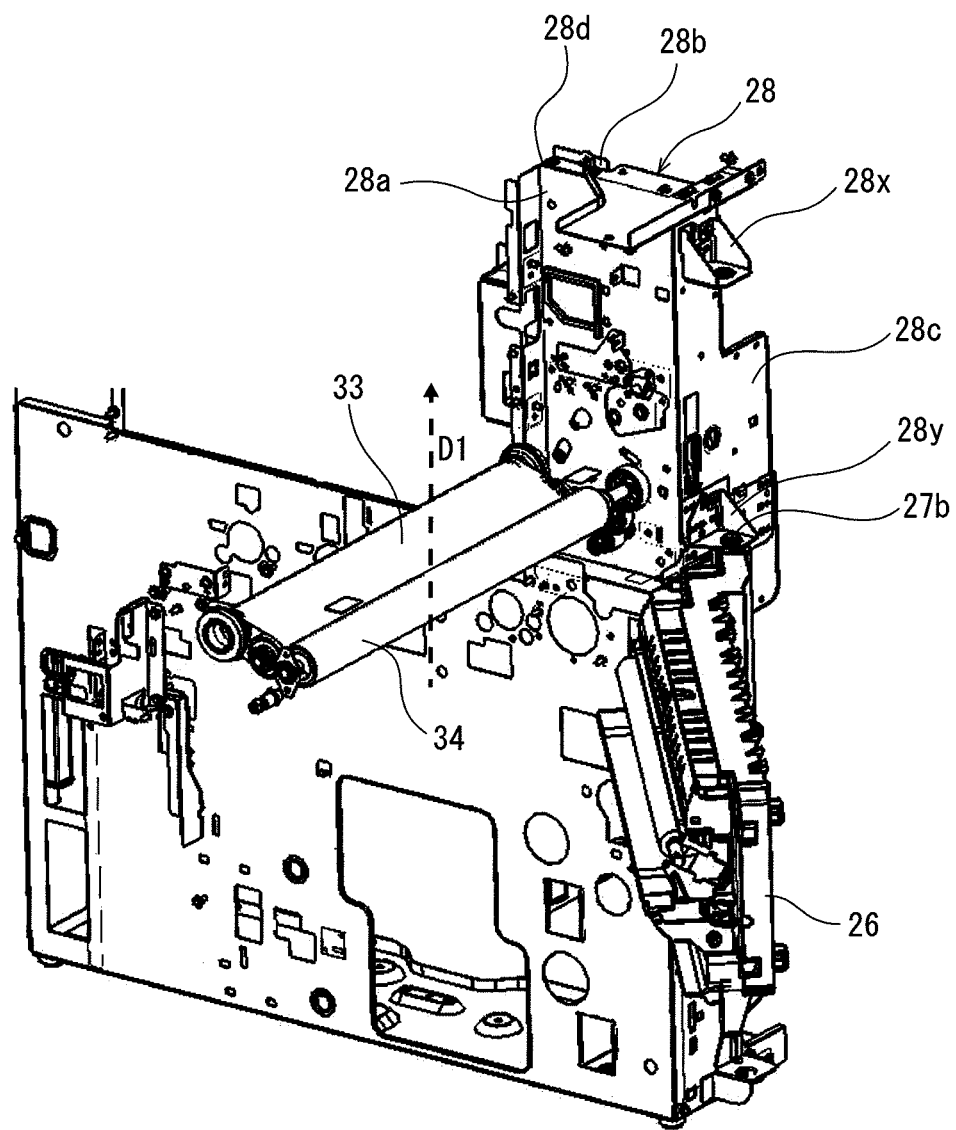
FIG. 3 is a perspective view illustrating a state where the upper part of the opening/closing door is removed from the perspective view of FIG. 2 for the explanation of the internal structure.

FIG. 2 is a perspective view of the main parts for the explanation of the relationship between the opening/closing door 26 and the fixing unit 30 in the sheet transport device, illustrating a state where the opening/closing door 26 has been moved around the axis approximately 30 degrees from the state of being closed. FIG. 3 is a perspective view illustrating a state where the upper part of the opening/closing door 26 is removed from the perspective view of FIG. 2 for the explanation of the internal structure.

As shown in FIG. 2, a back-side frame 28 is provided in the upper part, on the back side, of the image forming apparatus, and the drive unit 40 (see FIGS. 4 through 7) for driving the fixing unit 30 is attached to the back-side frame 28.

The back-side frame 28, formed in the shape of a hollow rectangular solid, includes a frame front face 28a, a frame back face 28b, a frame right side face 28c and a frame left side face 28d on the front side, back side, right side and left side, respectively. A lower portion of the frame front face 28a faces the back-side portion of the fixing unit 30.

A pair of brackets 28x and 28y, an upper bracket and a lower bracket, is provided in the frame right side face 28c of the back-side frame 28. A door supporting shaft 27a (illustrated only in FIG. 2) which supports the upper portion of the opening/closing door 26 rotatably, and a door supporting shaft 27b (illustrated in FIGS. 2 and 3) which supports the vertical middle portion of the opening/closing door 26 rotatably, are attached concentrically in the vertical direction to the brackets 28x and 28y, respectively. The opening/closing door 26 can be moved around the door supporting shafts 27a and 27b that align vertically.

When the recording sheet S transported to the fixing unit 30 is stuck and a paper jam occurs in the fixing unit 30, the opening/closing door 26 is moved around the door supporting shafts 27a and 27b. With this operation, the right side of the housing of the image forming apparatus is opened, making it possible to remove the stuck recording sheet S from the fixing unit 30.

Figure 4:
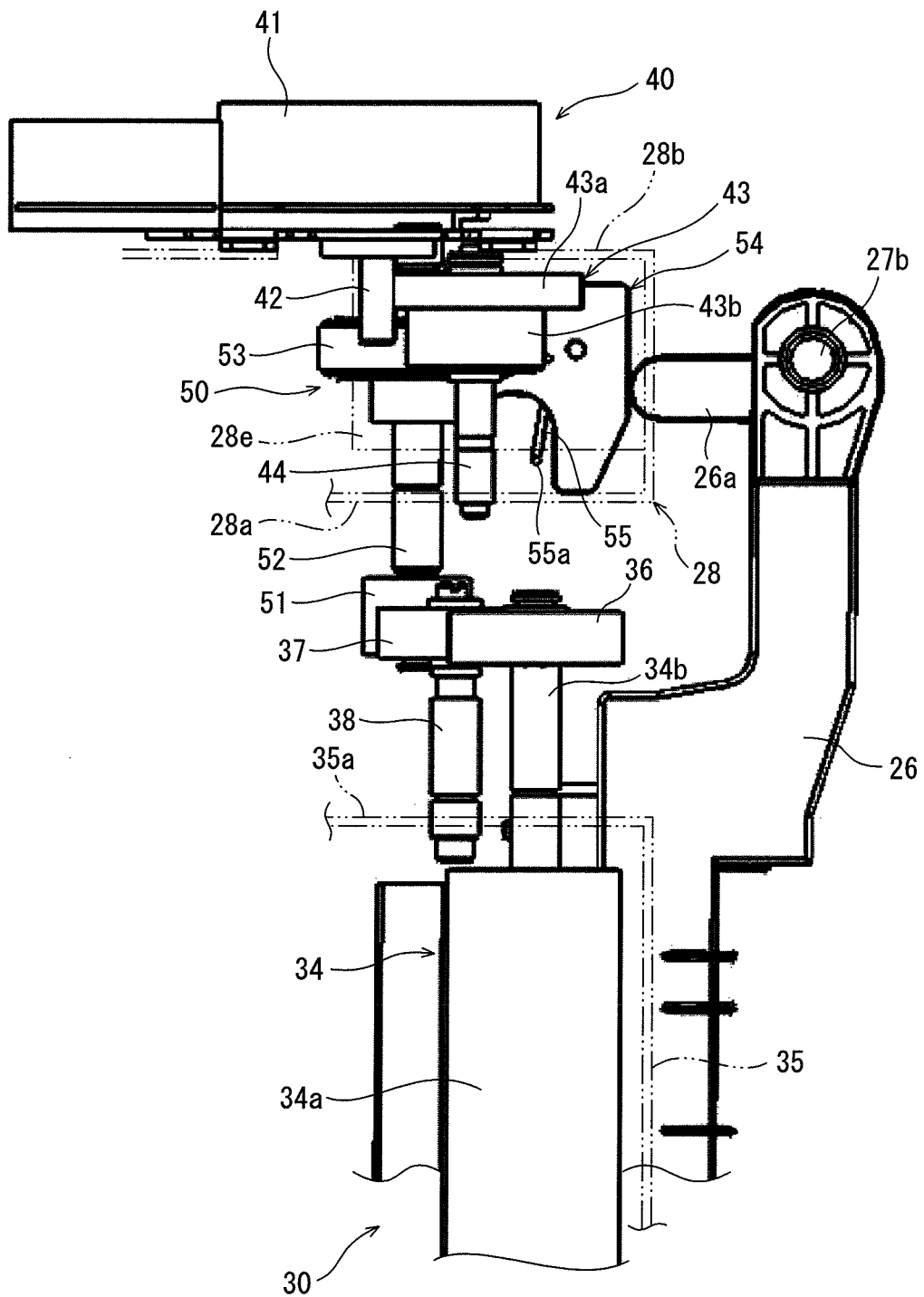
FIG. 4 is a plan view illustrating the structure of the main parts of the sheet transport device provided in the printer.
Figure 5:
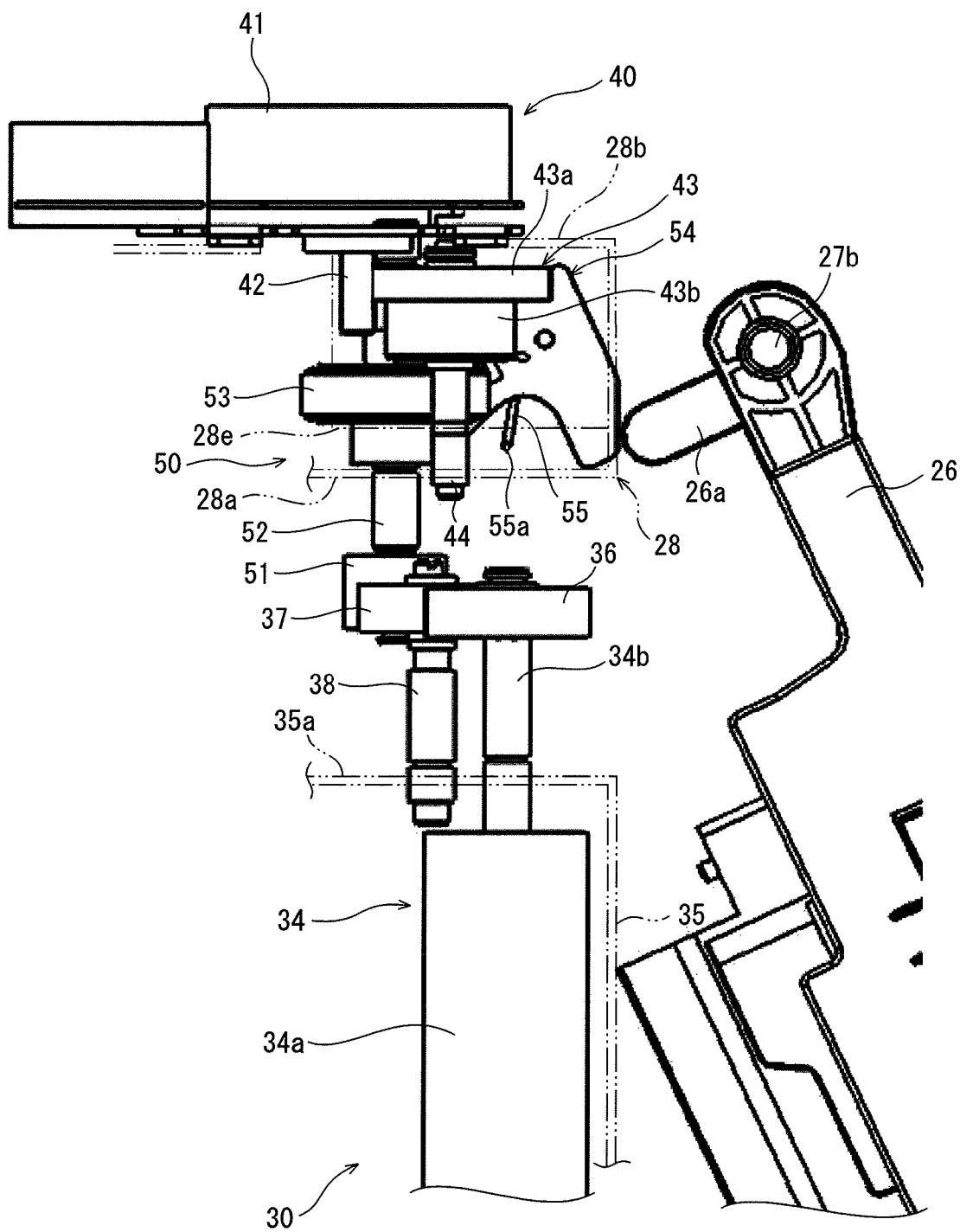
FIG. 5 illustrates an operation of the sheet transport device illustrated in FIG. 4.

FIGS. 4 and 5 are plan views illustrating the structure of the main parts of the sheet transport device. The drive unit 40 for driving the fixing unit 30 is attached to the back-side frame 28. The power transmission mechanism 50, which transmits the power of the drive unit 40 to the pressing roller 34 of the fixing unit 30, is switched between a power transmission state and a power non-transmission state by an engagement projection 26a attached to the opening/closing door 26, in conjunction with opening/closing operation of the opening/closing door 26.

Note that FIG. 4 illustrates a state where the opening/closing door 26 is closed and the power transmission mechanism 50 is in the power transmission state where the power of the drive unit 40 is transmitted to the fixing unit 30. Note that FIG. 5 illustrates a state where the opening/closing door 26 is open and the power transmission mechanism 50 is in the power non-transmission state where the power of the drive unit 40 is not transmitted to the fixing unit 30.

Figure 6:
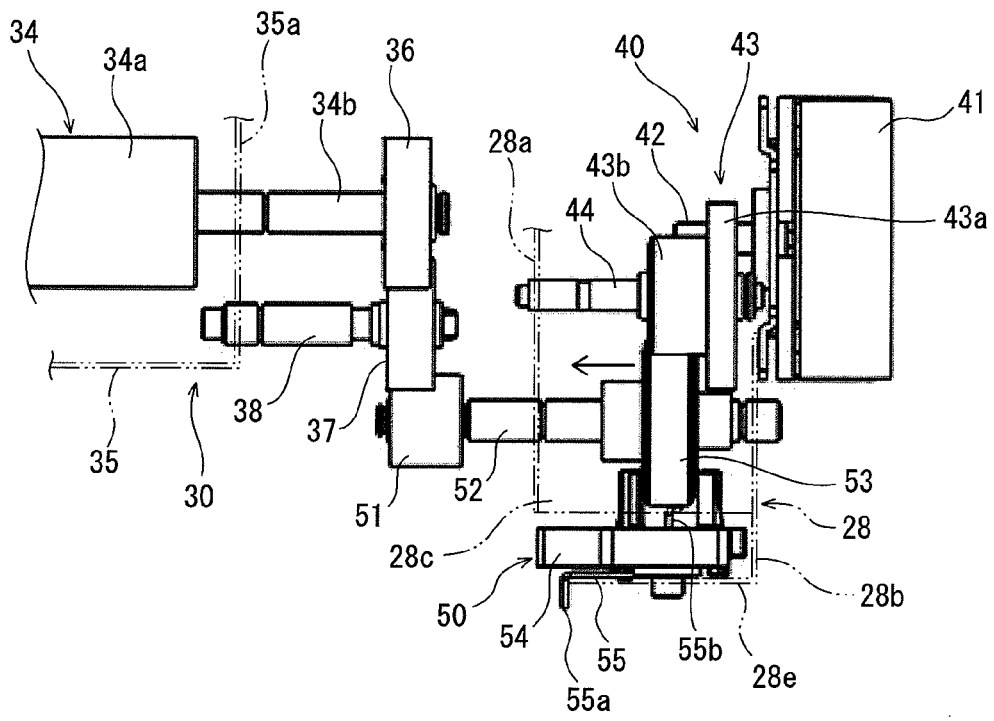
FIG. 6 is a right side view of the sheet transport device illustrated in FIG. 4.
Figure 7:
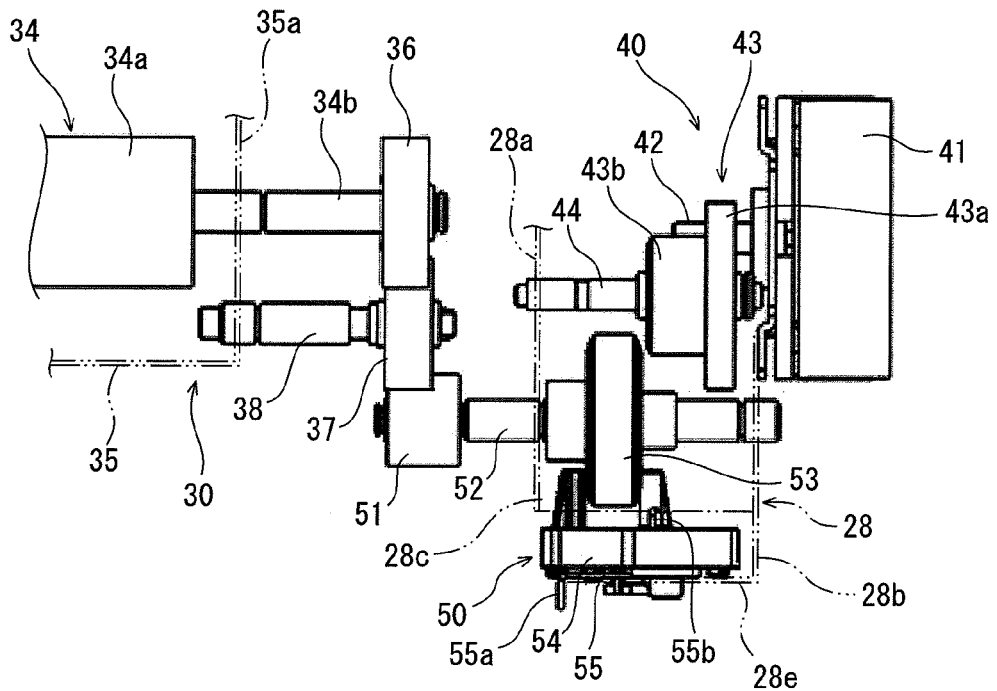
FIG. 7 illustrates an operation of the sheet transport device illustrated in FIG. 6.

FIG. 6 is a right side view illustrating the main parts of the sheet transport device. FIG. 7 is an explanatory diagram of the operation of the sheet transport device illustrated in FIG. 6. FIG. 6 illustrates a state where the opening/closing door 26 is closed (the power transmission mechanism 50 is in the power transmission state). FIG. 7 illustrates a state where the opening/closing door 26 is open (the power transmission mechanism 50 is in the power non-transmission state).

Figure 8:
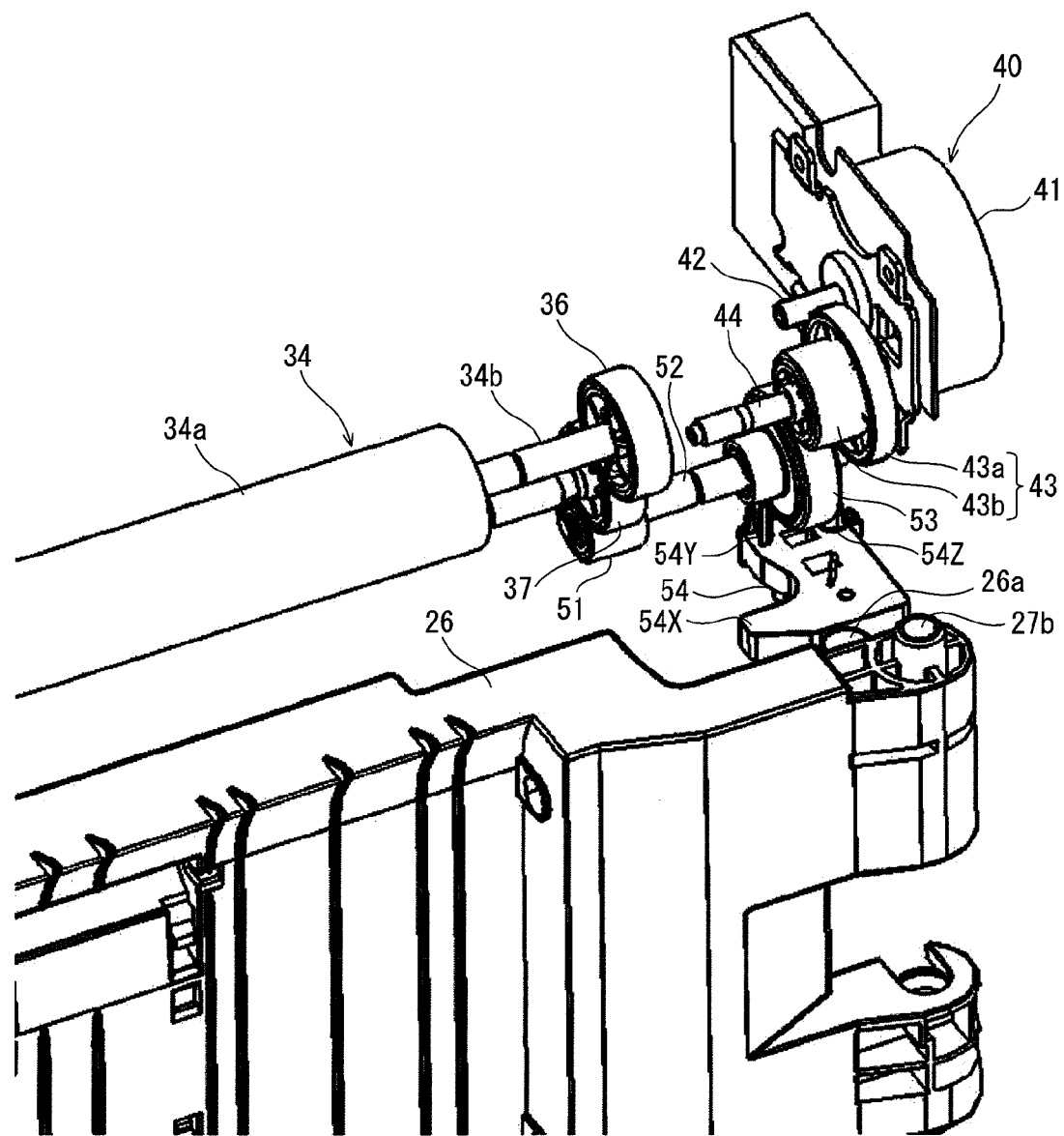
FIG. 8 is a perspective view illustrating the structure of the main parts of the sheet transport device illustrated in FIG. 4, in a state where the opening/closing door is closed.
Figure 9:
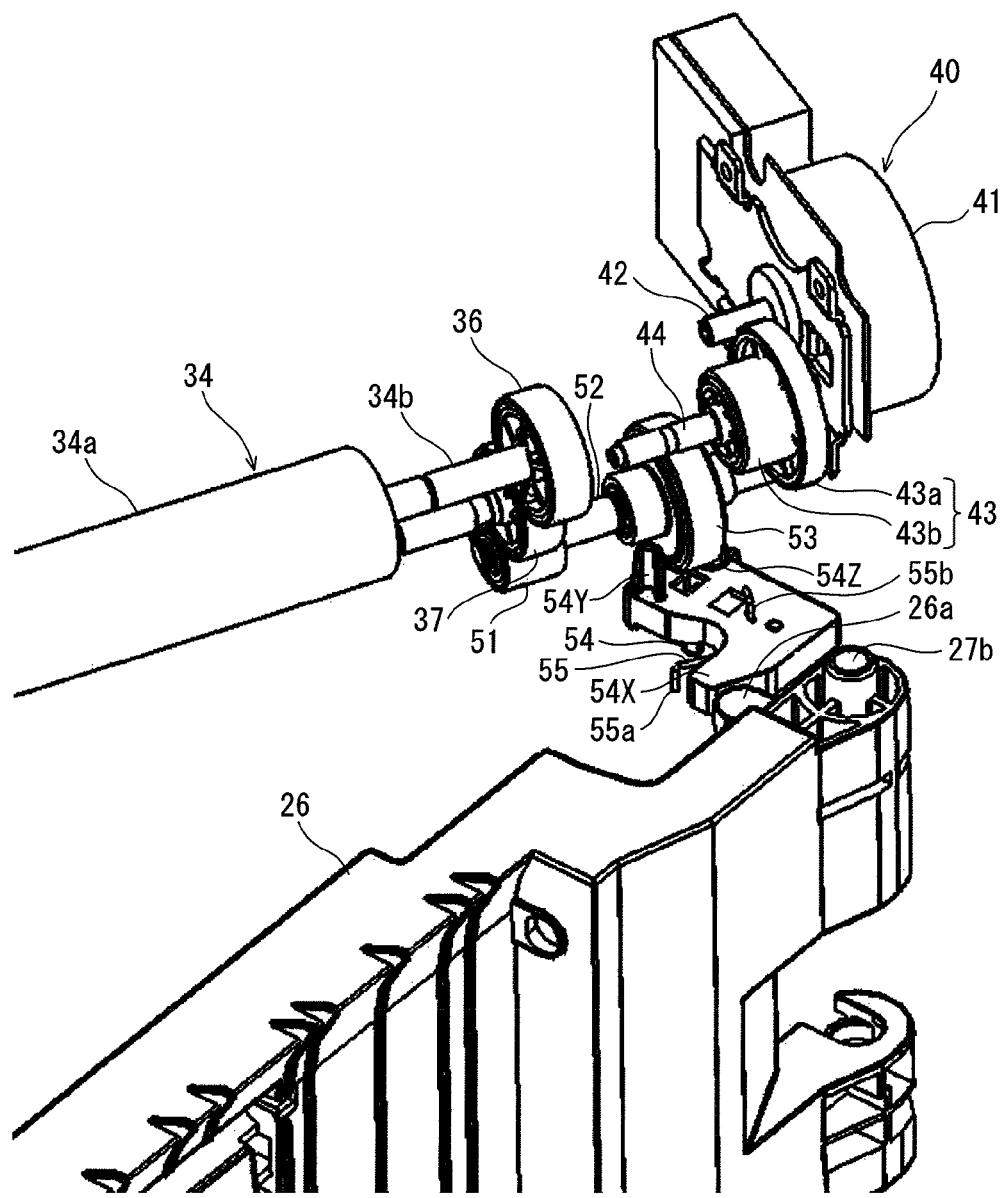
FIG. 9 is a perspective view illustrating the structure of the main parts of the sheet transport device illustrated in FIG. 8, in a state where the opening/closing door is open (the power transmission mechanism is in the power non-transmission state)

FIGS. 8 and 9 are perspective views illustrating the structure of the main parts of the sheet transport device, FIG. 8 illustrating a state where the opening/closing door 26 is closed (the power transmission mechanism 50 is in the power transmission state), and FIG. 9 illustrating a state where the opening/closing door 26 is open (the power transmission mechanism 50 is in the power non-transmission state). Note that in FIGS. 8 and 9, the housing 35 and the back-side frame 28 of the fixing unit 30 are omitted.

As illustrated in FIGS. 4 and 6, the drive unit 40 is attached to the frame back face 28b of the back-side frame 28 of the image forming apparatus. A frame supporting unit 28e is provided to extend horizontally from the lower part of the frame back face 28b toward the front side. The power transmission mechanism 50 is deposited on the frame supporting unit 28e. The power transmission mechanism 50 is located under the drive unit 40.

As illustrated in FIGS. 4, 6 and 8, the pressing roller 34 of the fixing unit 30 includes a roller body 34a and a rotational shaft 34b, wherein the roller body 34a and the fixing belt 33, when they are pressed against each other, form the fixing nip, and the rotational shaft 34b is deposited such that its axial center is also the axial center of the roller body 34a. The roller body 34a and the rotational shaft 34b rotate together as one unit.

As illustrated in FIGS. 4 and 6, the rotational shaft 34b passes through a back face 35a of the housing 35 of the fixing unit 30, and an end of the rotational shaft 34b on the back side of the apparatus is positioned between the back face 35a and the frame front face 28a of the back-side frame 28. A fixing input gear 36 is attached to this end of the rotational shaft 34b. The fixing input gear 36 is configured to rotate together with the rotational shaft 34b as one unit, and thus rotates together with the roller body 34a as well.

A fixing-side intermediate gear 37 meshes with the fixing input gear 36. As illustrated in FIGS. 4 and 6, the fixing-side intermediate gear 37 is attached rotatably to an intermediate supporting shaft 38 that is supported horizontally by the back face 35a of the housing 35. The intermediate supporting shaft 38 is provided to be aligned parallel to the rotational shaft 34b, at a position separated from and lower than the rotational shaft 34b, on the opposite side to the opening/closing door 26.

The drive unit 40 has a drive motor 41 that is attached to the back side of the frame back face 28b of the back-side frame 28. The drive shaft of the drive motor 41 projects toward the front side of the apparatus horizontally, passing through the frame back face 28b. A drive gear 42 is attached concentrically to the drive shaft of the drive motor 41, covering a portion of the drive shaft projecting from the frame back face 28b toward the front side of the apparatus. The drive gear 42 rotates together with the drive shaft of the drive motor 41 as one unit. Note that, a worm gear having skew teeth is used as the drive gear 42.

The drive gear 42 meshes with a reduction gear 43 (a first rotation transmitting member) provided in the back-side frame 28. The reduction gear 43 is attached concentrically and rotatably to a reduction support shaft 44 that is supported horizontally parallel to the drive shaft of the drive motor 41.

Figure 10:
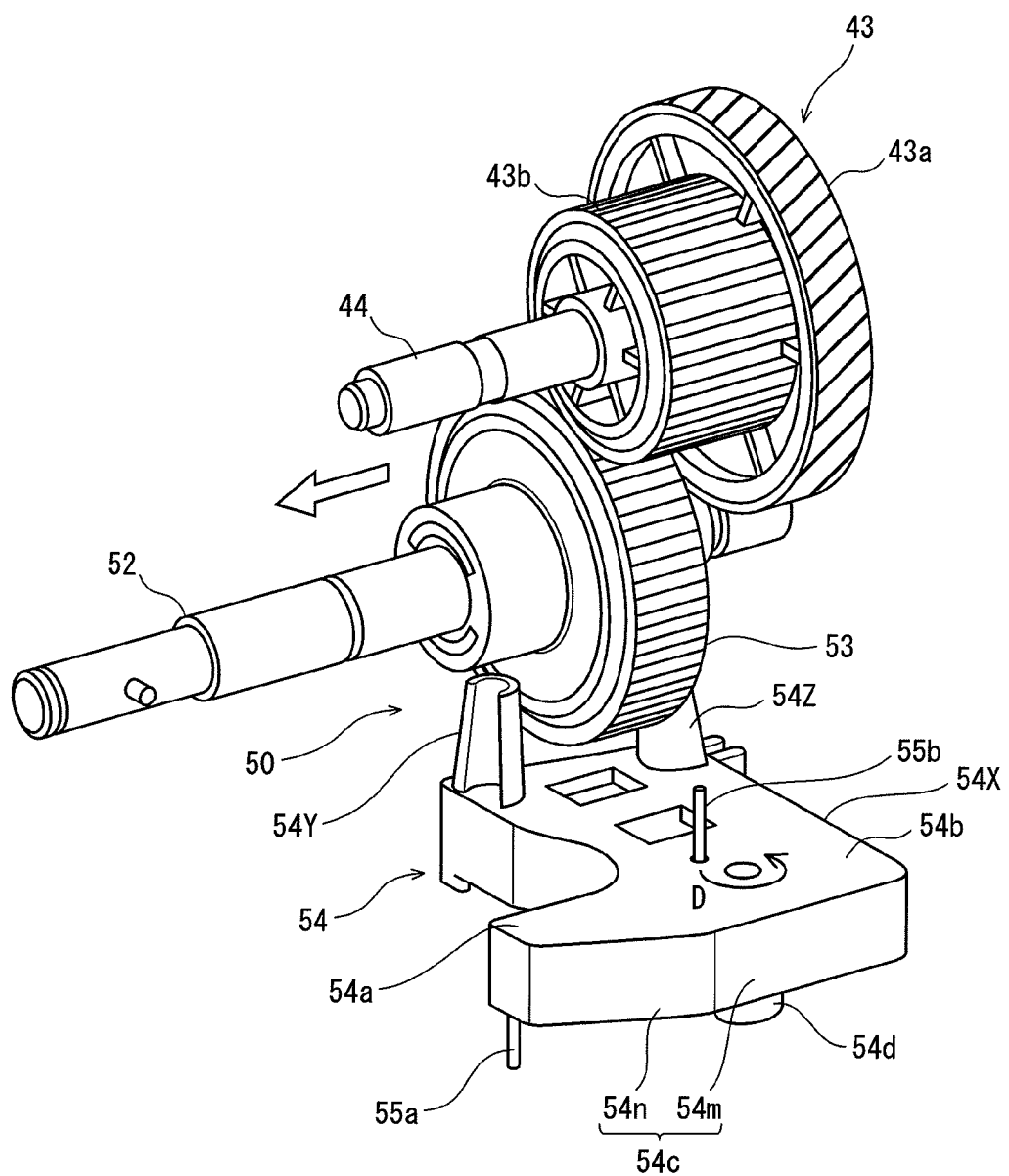
FIG. 10 is a perspective view illustrating the power transmission mechanism of the sheet transport device illustrated in FIG. 4, together with the reduction gear.

FIG. 10 is a perspective view illustrating the power transmission mechanism 50 of the sheet transport device and the reduction gear 43. The reduction gear 43 includes an input gear 43a and an output gear 43b, wherein the input gear 43a meshes with the drive gear 42 attached to the drive motor 41, and the output gear 43b is attached concentrically to the input gear 43a to be located more on the front side of the apparatus than the input gear 43a. The input gear 43a has a larger diameter than the drive gear 42 and has helical teeth to mesh with the drive gear 42 that is a worm gear. The output gear 43b is larger than the drive gear 42 and smaller than the input gear 43a in diameter and has spur teeth.

Power transmission between the power transmission mechanism 50 and the output gear 43b of the drive unit 40 is switched between the power transmission state and the power non-transmission state in conjunction with the opening/closing operation of the opening/closing door 26. As illustrated in FIGS. 8 and 9, a front-side portion of the power transmission mechanism 50 is lower than a back-side portion of the pressing roller 34 of the fixing unit 30, and is in the power transmission state with the fixing-side intermediate gear 37 of the fixing unit 30.

The power transmission mechanism 50 includes a power transmission shaft 52 that is disposed horizontally between the frame front face 28a and the frame back face 28b of the back-side frame 28 in a rotatable manner. The power transmission shaft 52 is provided at a position separated from the opening/closing door 26 and lower than the reduction support shaft 44 to which the reduction gear 43 of the drive unit 40 is attached. A front-side end of the power transmission shaft 52 projects toward the front side from the frame front face 28a.

A docking gear 51, which is meshed with the fixing-side intermediate gear 37, is attached to the front-side end of the power transmission shaft 52 projecting toward the front side from the frame front face 28a. The docking gear 51 has a smaller diameter than the fixing-side intermediate gear 37 and rotates together with the power transmission shaft 52 as one unit.

A slide gear (a second rotation transmitting member) 53 is attached to the power transmission shaft 52 at a position located between the frame front face 28a and the frame back face 28b of the back-side frame 28. To the slide gear 53, for example, a pin is attached, wherein the pin is fit in a slidable manner to a keyway provided in the power transmission shaft 52. The structure where the pin is attached in a slidable manner to the keyway enables the slide gear 53 to rotate together with the power transmission shaft 52 while the slide gear 53 can slide in the axis direction relative to the power transmission shaft 52.

As illustrated in FIG. 10, when the slide gear 53 slides relative to the power transmission shaft 52 toward the back side, the slide gear 53 meshes with the output gear 43b of the drive gear 42 provided in the drive unit 40 and gets into the power transmission state. On the other hand, as illustrated in FIGS. 5, 7 and 9, when the slide gear 53 slides toward the front side, the slide gear 53 comes out of the meshing state with the output gear 43b and gets into the power non-transmission state where the slide gear 53 does not receive transmission of power from the output gear 43b.

As illustrated in FIGS. 4, 6 and 8, a switch lever 54, which allows the slide gear 53 to slide along the power transmission shaft 52, is provided below the power transmission shaft 52. As illustrated in FIGS. 4 and 6, the switch lever 54 is installed on the frame supporting unit 28e that extends horizontally from the lower part of the frame back face 28b of the back-side frame 28, such that the switch lever 54 can move rotationally along a horizontal plane in conjunction with the opening/closing operation of the opening/closing door 26.

Figure 11:
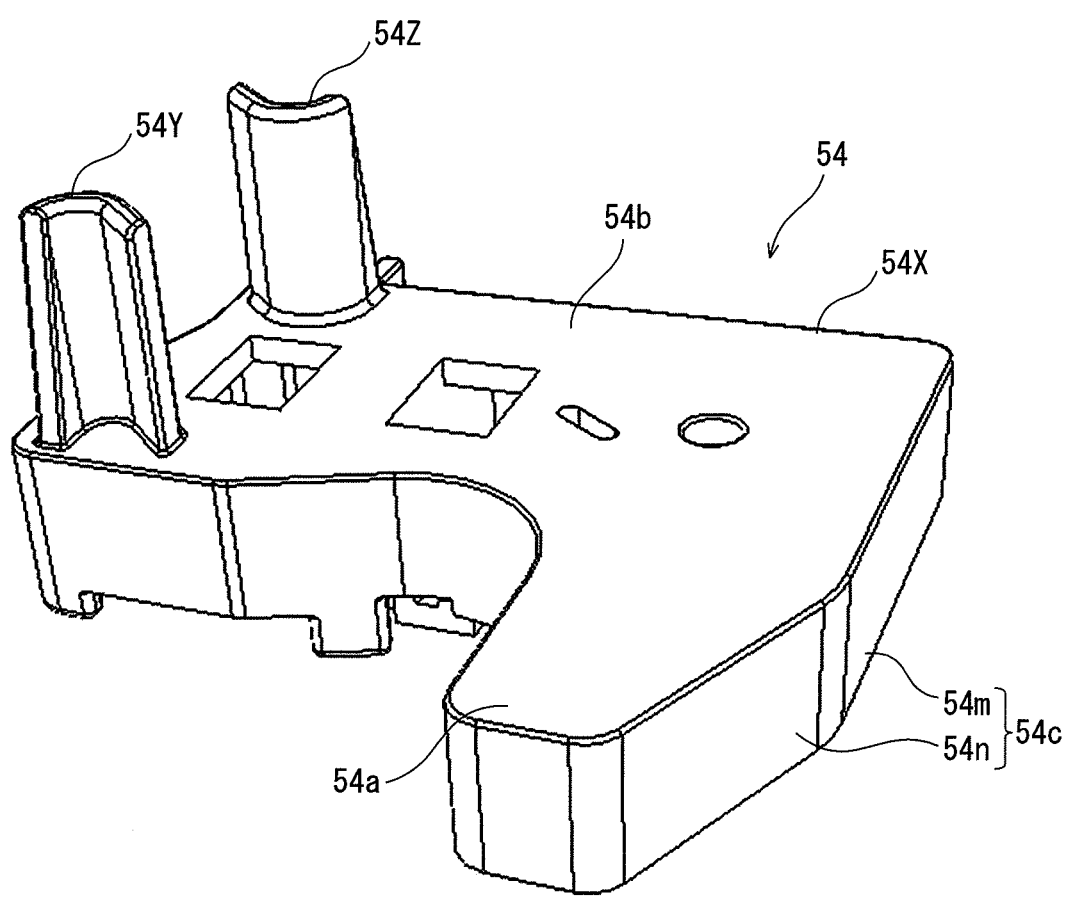
FIG. 11 is a perspective view of a switch lever provided in the power transmission mechanism of the sheet transport device illustrated in FIG. 4, viewing from the front side.
Figure 12:
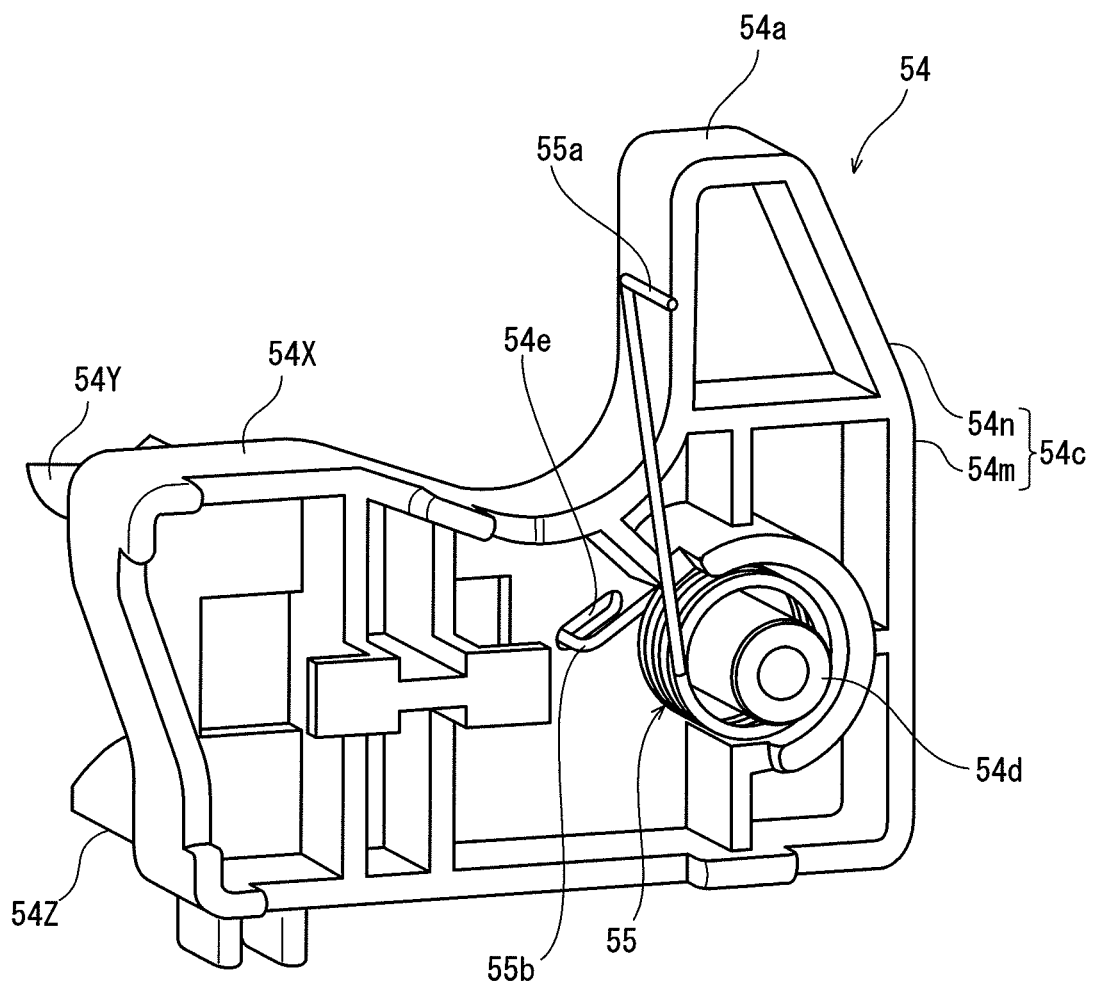
FIG. 12 is a perspective view of the switch lever illustrated in FIG. 11, viewing from below.

FIG. 11 is a perspective view of the switch lever 54 viewing from the front side. FIG. 12 is a perspective view of the switch lever 54 viewing from below. The switch lever 54 includes a holding member 54X, a front-side contact part (a second contact member) 54Y and a back-side contact part (a first contact member) 54Z, wherein the holding member 54X is laid on the frame supporting unit 28e, and the front-side contact part 54Y and the back-side contact part 54Z are installed on the holding member 54X so as to sandwich the slide gear 53. The front-side contact part 54Y is disposed on the front side of the slide gear 53, and the back-side contact part 54Z is disposed on the back side of the slide gear 53. Both of the front-side contact part 54Y and the back-side contact part 54Z project upward from the holding member 54X. The holding member 54X, the front-side contact part 54Y and the back-side contact part 54Z are molded as one unit from a synthetic resin.

Also, as illustrated in FIG. 12, a coil spring 55 is attached to a lower face of the holding member 54X, namely, to a face of the holding member 54X opposite to the front-side contact part 54Y and the back-side contact part 54Z.

Figure 13B:
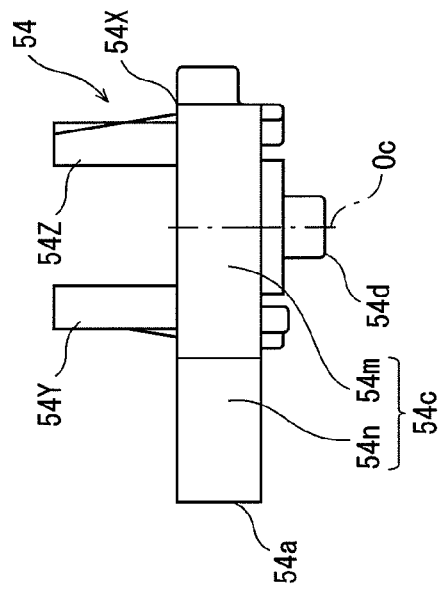
FIG. 13B is a side view of the switch lever.
Figure 13A:
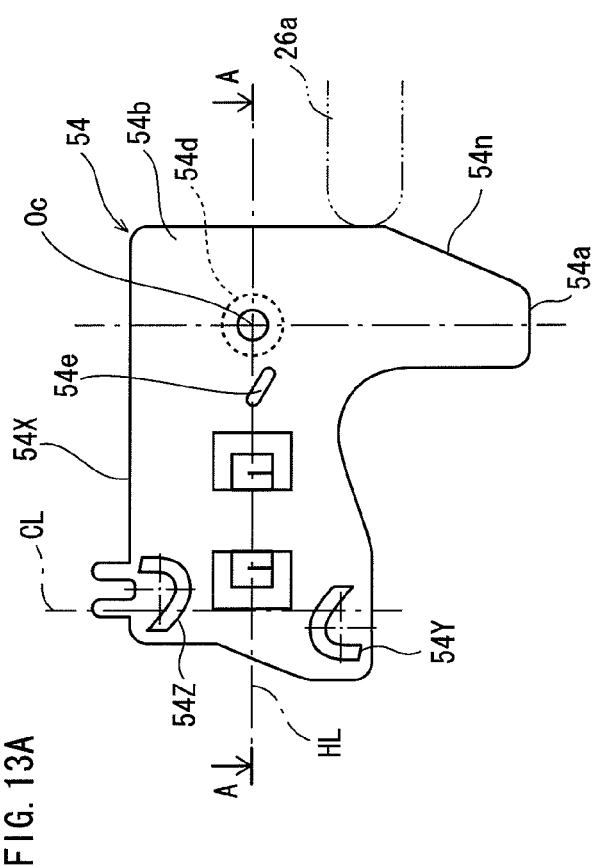
FIG. 13A is a plan view of the switch lever illustrated in FIG. 12.
Figure 13C:
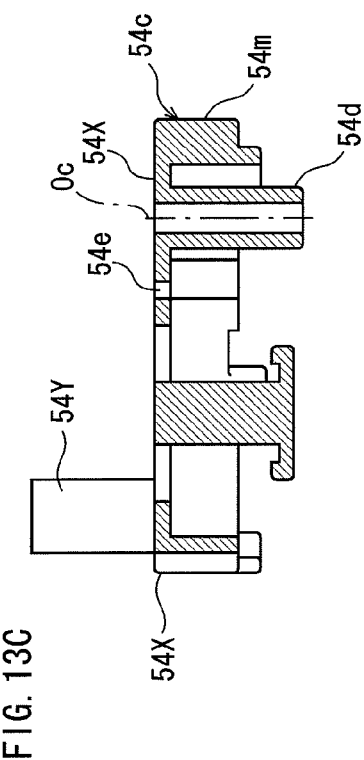
FIG. 13C is a vertical sectional view of the switch lever.

FIG. 13A is a plan view of the switch lever 54. FIG. 13B is a side view of the switch lever 54. FIG. 13C is a vertical sectional view of the switch lever 54. Note that, in FIGS. 13A through 13C, the coil spring 55 is omitted.

As illustrated in FIGS. 10 and 11, a portion of the holding member 54X close to the opening/closing door 26 is formed as a projecting part 54a that projects toward the front side of the image forming apparatus. Also, a portion of the holding member 54X separated from the opening/closing door 26 is located below the slide gear 53 and faces the area in which the slide gear 53 slides. An upper face 54b of the holding member 54X is a horizontal plane separated from the slide gear 53 by an appropriate distance.

As illustrated in FIGS. 10 through 13, a guide side plate 54c is provided as a side face of the holding member 54X, close to the opening/closing door 26, in such a manner that the guide side plate 54c drops downward from the upper face 54b. When the opening/closing door 26 is closed (see FIG. 6), a tip of the engagement projection 26a attached to the opening/closing door 26 is pressed against the guide side plate 54c. This causes the switch lever 54 to move rotationally toward the back side of the apparatus. In this state, the rotational move of the switch lever 54 is restricted by the engagement projection 26a.

As illustrated in FIGS. 4 through 9, the engagement projection 26a is a belt-like plate, and is installed in a vicinity of the door supporting shaft 27b so as to project away from the opening/closing door 26 horizontally in a state where its thickness extends in the vertical direction. The engagement projection 26a projects away from the opening/closing door 26 and the tip of the engagement projection 26a is curved horizontally like an arc, and the tip of the engagement projection 26a contacts the guide side plate 54c of the holding member 54X.

As illustrated in FIGS. 10 through 13, an outer face of the guide side plate 54c of the holding member 54X includes: a contact face 54m located on the back side; and a guide face 54n located on the front side. In the state where the switch lever 54 has been moved rotationally toward the back side of the apparatus, the contact face 54m extends from the front side to the back side of the image forming apparatus (is parallel to the opening/closing door 26 which is in the state of being closed). The guide face 54n is provided as an outer side face of the projecting part 54a on the opening/closing door 26 side, and is angled from the contact face 54m as can be seen in a plan view such that, when the opening/closing door 26 is closed, the guide face 54n goes toward the front side of the apparatus with distance from the opening/closing door 26. An end side face of the projecting part 54a on the front side of the apparatus extends horizontally (perpendicular to the opening/closing door 26 in the state of being closed).

When the opening/closing door 26 is in the state of being closed, the arc-like tip of the engagement projection 26a of the opening/closing door 26 is pressed against the contact face 54m that is adjacent to the guide face 54n in the guide side plate 54c. When the opening/closing door 26 is moved rotationally to be open, the tip of the engagement projection 26a moves together with the opening/closing door 26 as one unit. Since the engagement projection 26a is formed as one unit with the opening/closing door 26, when the opening/closing door 26 moves rotationally to be closed, the tip of the engagement projection 26a slides from the contact face 54m to the guide face 54n.

As illustrated in FIGS. 12 and 13, a cylindrical boss 54d projecting downward is provided on the back face of the upper face 54b of the holding member 54X. The lower end of the boss 54d is inserted rotatably into a through hole (not illustrated) provided in the frame supporting unit 28e. This structure allows the holding member 54X to move rotationally (rotate) around the shaft center (supporting axis) of the boss 54d in the horizontal direction. The boss 54d is provided at approximately the center of the contact face 54m in a front-back direction, and at approximately the center of the projecting part 54a in a direction perpendicular to the front-back direction.

When the holding member 54X moves rotationally around the supporting axis of the boss 54d along a horizontal plane, a portion of the holding member 54X, which faces an area (slide area) in which the slide gear 53 slides, rotationally moves approximately along a direction in which the slide gear 53 slides, approximately in the front-back direction. Note that the supporting axis (shaft center) of the boss 54d, which is the rotational axis of the holding member 54X, is located slightly more on the back side than the shaft center of the door supporting shaft 27b which is the rotational axis of the opening/closing door 26.

As illustrated in FIG. 12, the coil spring 55 is a metal wire wound in the shape of a coil, and is fit to the boss 54d. An end 55a of the wire constituting the coil spring 55 extends toward the projecting part 54a of the holding member 54X and engages with a side edge of the frame supporting unit 28e (FIGS. 4 and 6). Another end 55b of the wire constituting the coil spring 55 passes through a through hole 54e provided in the upper face 54b of the holding member 54X and comes out up on the upper face 54b. The end 55b of the wire, having passed through the through hole 54e, engages with the upper face 54b of the holding member 54X.

The coil spring 55 applies a pressure, around the boss 54d, to the switch lever 54 in a direction in which the projecting part 54a of the switch lever 54 moves closer to the opening/closing door 26 (direction D indicated by the arrow in FIG. 10). When the opening/closing door 26 is in the state of being closed, the tip of the engagement projection 26a of the opening/closing door 26 is pressed against the contact face 54m in the guide side plate 54c. This structure restricts the rotational move of the switch lever 54, with the contact face 54m aligning parallel to the closed opening/closing door 26.

On the other hand, when the opening/closing door 26 is opened, the tip of the engagement projection 26a moves from the contact face 54m to the guide face 54n on the front side in the guide side plate 54c, and the guide side plate 54c is released from the state of being pressed. This allows the switch lever 54 to be moved rotationally in a direction in which the projecting part 54a of the switch lever 54 moves closer to the opening/closing door 26 around the shaft center of the holding member 54X, by the pressure applied from the coil spring 55.

As illustrated in FIGS. 6, 7 and 10, the front-side contact part 54Y and the back-side contact part 54Z of the holding member 54X are deposited in a region of the holding member 54X that faces the slide area in which the slide gear 53 slides. As illustrated in FIG. 13A, the front-side contact part 54Y and the back-side contact part 54Z are deposited on the upper face 54b (horizontal plane) of the holding member 54X in the switch lever 54, along a shaft center line CL of the power transmission shaft 52 with a predetermined distance therebetween, sandwiching a straight line HL, wherein the straight line HL (hereinafter also referred to as "reference line") is a straight line that passes through a rotational axis Oc of the switch lever 54 located at the supporting axis of the boss 54d and is perpendicular to the shaft center line CL.

As illustrated in FIG. 11, each of the front-side contact part 54Y and the back-side contact part 54Z has a shape of semicylinder (a half pipe), and the center axis thereof is parallel to the supporting axis of the holding member 54X. As illustrated in FIG. 10, a portion of the slide gear 53 (a portion located below the power transmission shaft 52) is fit between the front-side contact part 54Y and the back-side contact part 54Z, with a proper gap therebetween. The front-side contact part 54Y and the back-side contact part 54Z are arranged such that the outer circumferential faces of them, which are in the shape of semicylinder, face toward the back side and the front side (both facing toward the slide gear 53), respectively.

Figure 14A:
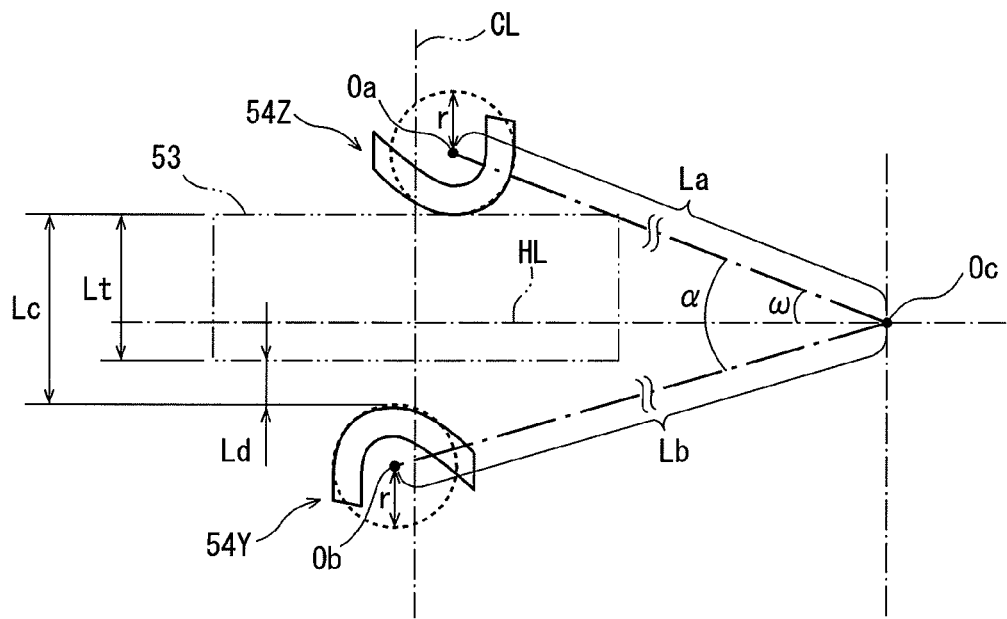
FIGS. 14A and 14B are schematic diagrams for explanation of the relationship between the slide gear and the switch lever, FIG. 14A illustrating a case where the slide gear and the reduction gear are in the power transmission state, FIG. 14B illustrating a case where the slide gear and the reduction gear are in the power non-transmission state.
Figure 14B:
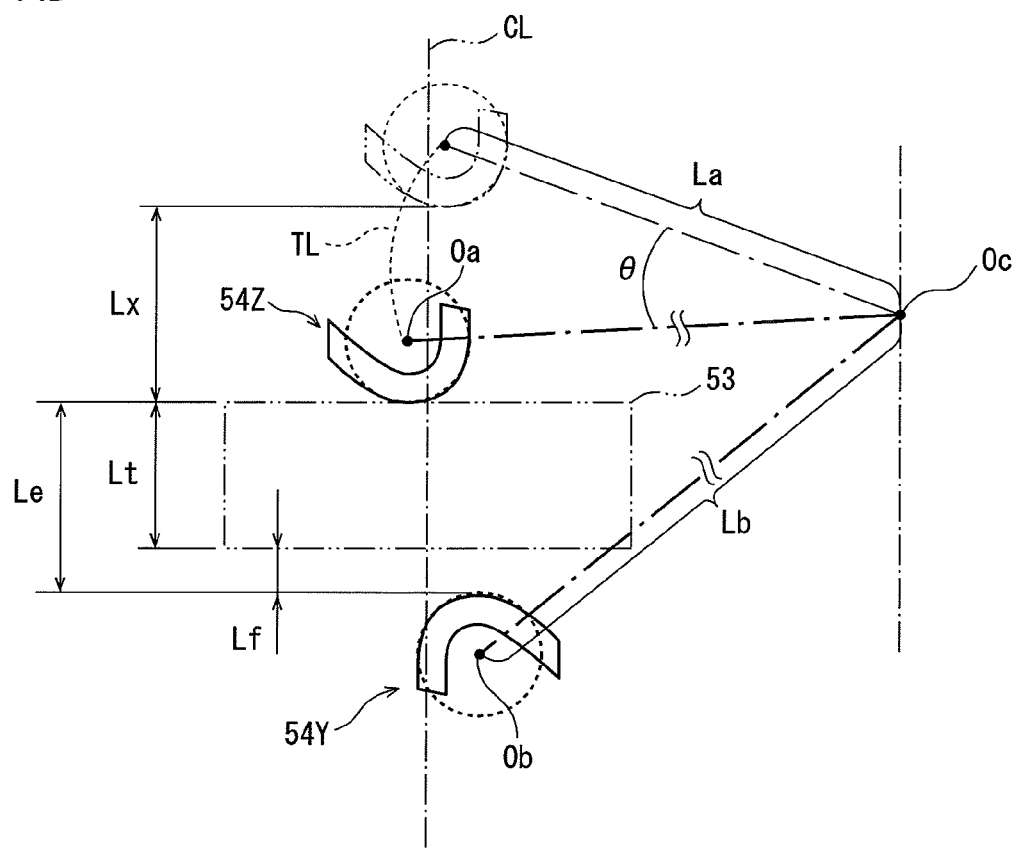

FIGS. 14A and 14B are schematic diagrams viewing from a direction of the supporting axis of the holding member 54X of the switch lever 54 (plan views). FIG. 14A illustrates a case where the slide gear 53 and the reduction gear 43 are in the power transmission state. FIG. 14B illustrates a case where the slide gear 53 and the reduction gear 43 are in the power non-transmission state.

As illustrated in FIG. 14A, the circumferential face of the front-side contact part 54Y, except for the side edges in the circumferential direction (side edges located approximately along the horizontal direction), has a circumference of a circuit with a radius "r"; and the side edges in the circumferential direction are shaped like plain plates extending along lines that are tangent to the circle. The circumferential face of the semi-cylindrical front-side contact part 54Y is formed in a range to contact the slide gear 53 at least between the start and the end of switching between the power transmission state and the power non-transmission state while the holding member 54X moves rotationally.

Similarly to the front-side contact part 54Y, the circumferential face of the back-side contact part 54Z, except for the side edges in the circumferential direction (side edges located approximately along the horizontal direction), has the circumference of the circuit with the radius "r"; and the side edges in the circumferential direction are shaped like plain plates extending along lines that are tangent to the circle. Also, the circumferential face of the back-side contact part 54Z is formed in a range to contact the slide gear 53 at least between the start and the end of switching between the power transmission state and the power non-transmission state while the holding member 54X moves rotationally.

The center axis Ob of the circuit with radius "r" in the front-side contact part 54Y (hereinafter the center axis Ob is referred to as "front-side center axis Ob") is located to be farther away from the rotational axis Oc of the holding member 54X than the center axis Oa of the circuit with radius "r" in the back-side contact part 54Z (hereinafter the center axis Oa is referred to as "back-side center axis Oa"). A vertical plane including the shaft center line CL of the power transmission shaft 52 is positioned between the front-side center axis Ob and the back-side center axis Oa.

Note that, when the projecting part 54a of the switch lever 54 is moved rotationally to be separated from the opening/closing door 26, the front-side contact part 54Y moves rotationally toward the back side of the image forming apparatus and contacts a front-side face of the slide gear 53. In this state, when the switch lever 54 is kept to move rotationally in the same direction, the slide gear 53 is caused to slide toward the back side along the power transmission shaft 52 by the front-side contact part 54Y, and the slide gear 53 gets into a state (the power transmission state) where it meshes with the output gear 43b of the reduction gear 43 in the drive unit 40.

In the power transmission state where the slide gear 53 meshes with the output gear 43b of the reduction gear 43, the circumferential face of the circuit with radius "r" in the front-side contact part 54Y faces the front-side face of the slide gear 53, and the circumferential face of the circuit with radius "r" in the back-side contact part 54Z faces the back-side face of the slide gear 53. In this state, the distance between the front-side contact part 54Y and the back-side contact part 54Z is larger than the thickness of the slide gear 53 and there is a gap between the slide gear 53 and the front-side contact part 54Y and the back-side contact part 54Z.

In the present embodiment, in the power transmission state where the slide gear 53 meshes with the output gear 43b of the reduction gear 43, the back-side contact part 54Z contacts the slide gear 53 at a position that is slightly more on the rotational axis Oc side than the vertical plane including the shaft center line CL of the power transmission shaft 52; and the front-side contact part 54Y contacts the slide gear 53 at a position that is slightly more on the opposite side to the rotational axis Oc than the vertical plane including the shaft center line CL of the power transmission shaft 52.

<Operation of Sheet Transport Device>

In the sheet transport device with the above structure, when the opening/closing door 26 is closed, the tip of the engagement projection 26a of the opening/closing door 26 is pressed against the contact face 54m of the guide side plate 54c in the switch lever 54 (see FIGS. 6 and 8). When an attempt is made to close the opening/closing door 26, first the tip of the engagement projection 26a becomes contact with the guide face 54n, and the projecting part 54a of the switch lever 54 is pressed in a direction that goes away from the opening/closing door 26.

This causes the switch lever 54 to move rotationally around the shaft center (supporting axis) of the boss 54d along the horizontal plane toward the direction in which the projecting part 54a of the switch lever 54 goes away from the opening/closing door 26. As the switch lever 54 moves rotationally, the front-side contact part 54Y and the back-side contact part 54Z move rotationally toward the back side of the image forming apparatus, and the front-side contact part 54Y causes the slide gear 53 located between them to slide toward the back side of the image forming apparatus along the power transmission shaft 52.

When the slide gear 53 slides toward the back side of the image forming apparatus, the slide gear 53 gets into the state where it meshes with the output gear 43b of the reduction gear 43 in the drive unit 40, and the slide gear 53 and the reduction gear 43 get into the power transmission state. In this state, the tip of the engagement projection 26*a* is pressed against the contact face 54*m* of the guide side plate 54*c* in the switch lever 54.

When the opening/closing door 26 is closed, the opening/closing door 26 is kept closed by a magnetic force or the like. In this state where the switch lever 54 has been moved rotationally toward the back side along the horizontal direction, the engagement projection 26*a* restricts the switch lever 54 from moving rotationally, resisting the urging force from the coil spring 55.

In the state where the rotational move of the switch lever 54 is restricted by the engagement projection 26*a*, the slide gear 53 positioned between the front-side contact part 54Y and the back-side contact part 54Z of the switch lever 54 is in a state of not receiving a pressure from the front-side contact part 54Y and the back-side contact part 54Z.

When an image formation operation is executed in this state, the drive motor 41 of the drive unit 40 is driven to rotate, the power of the drive motor 41 is transmitted to the reduction gear 43 via the drive gear 42, and the power is transmitted from the reduction gear 43 to the slide gear 53 which is in the power transmission state.

The slide gear 53 then rotates, and since the slide gear 53 is structured to rotate together with the power transmission shaft 52, the rotation of the slide gear 53 causes the power transmission shaft 52 to rotate, and further the docking gear 51 attached to the power transmission shaft 52. Since the docking gear 51 is in the state where it meshes with the fixing-side intermediate gear 37 of the fixing unit 30, the rotation of the docking gear 51 is transmitted to the fixing-side intermediate gear 37, and the fixing input gear 36 meshing with the fixing-side intermediate gear 37 rotates.

This causes the rotational shaft 34*b* of the pressing roller 34 attached to the fixing input gear 36 to rotate, and the roller body 34*a*, which is structured to rotate together with the rotational shaft 34*b*, rotates. The rotation of the roller body 34*a* of the pressing roller 34 causes the fixing belt 33, which is pressed against the roller body 34*a*, to move in a circulating motion, allowing the recording sheet S having been transported to the fixing nip to be transported by the roller body 34*a* and the fixing belt 33. When the recording sheet S passes through the fixing nip, the unfixed toner image on the recording sheet is fixed onto the recording sheet S.

In this case, as described above, there is a gap between the rotating slide gear 53 and the front-side contact part 54Y and the back-side contact part 54Z. Thus the slide gear 53, with no pressure received from the front-side contact part 54Y and the back-side contact part 54Z, can transmit the rotation of the drive motor 41 to the pressing roller 34 stably.

Note that, since the slide gear 53 can slide relative to the power transmission shaft 52, the slide gear 53, while rotating, may contact either the front-side contact part 54Y or the back-side contact part 54Z. In that case, however, since there is a gap between the slide gear 53 and the front-side contact part 54Y and the back-side contact part 54Z, if the slide gear 53 contacts the front-side contact part 54Y or the back-side contact part 54Z, the slide gear 53 receives a reactive force from the contact part and due to the reactive force, the slide gear 53 slides away from the contact part.

In this way, since the slide gear 53 does not receive a pressure in the axis direction of the power transmission shaft 52, even if it contacts the front-side contact part 54Y or the back-side contact part 54Z, the slide gear 53 does not receive a large pressure from the contact. In addition, even if the slide gear 53 contacts the front-side contact part 54Y or the back-side contact part 54Z, the contact state is not maintained. This restricts the wear of the slide gear 53. Also, in this case, there is no possibility that the rotation speed of the slide gear 53 changes greatly. This makes it possible for the slide gear 53 to transmit the rotation of the drive motor 41 to the pressing roller 34 stably.

If a paper jam with the recording sheet S occurs in the fixing nip during such an image formation operation, an attempt is made to remove the recording sheet S from the fixing nip. In this case, first the opening/closing door 26 is moved rotationally around the door supporting shaft 27*a* and the door supporting shaft 27*b* so that the right side of the image forming apparatus (apparatus housing) is opened (see FIGS. 2, 3, 5, 7 and 9). This causes the tip of the engagement projection 26*a* of the opening/closing door 26 to slide from the contact face 54*m* to the guide face 54*n* in the guide side plate 54*c* of the switch lever 54, and the contact face 54*m* is released from the state of being pressed (see FIGS. 5, 7 and 9).

Following this, when the opening/closing door 26 is further moved rotationally in the same direction, the tip of the engagement projection 26*a* of the opening/closing door 26 moves away from the projecting part 54*a* of the switch lever 54. With this operation, by the urging force of the coil spring 55, the switch lever 54 moves rotationally around the supporting axis of the boss 54*d* toward a direction in which the projecting part 54*a* becomes closer to the opening/closing door 26, and the opening/closing door 26, to which the engagement projection 26*a* is attached, is moved by the urging force of the coil spring 55 to open the right side of the image forming apparatus. Note that, since there is no particular restriction in the direction of the rotational move of the switch lever 54 that is caused by the urging force of the coil spring 55, the rotational move of the switch lever 54 continues until the urging force of the coil spring 55 is completely released.

When the switch lever 54 is moved rotationally, the slide gear 53 located between the front-side contact part 54Y and the back-side contact part 54Z is pressed by the back-side contact part 54Z and slides toward the front side of the image forming apparatus along the power transmission shaft 52. This causes the slide gear 53 to be released from the meshing state with the output gear 43*b* of the reduction gear 43 in the drive unit 40, and the slide gear 53 and the reduction gear 43 to be in the power non-transmission state.

In this state, the slide gear 53, which has become slidable relative to the power transmission shaft 52, merely receives a pressure from the back-side contact part 54Z contacting the slide gear 53, and thus the slide gear 53 meets a small resistive force during sliding and can slide smoothly and speedily. In addition, a heavy load is not applied to the slide gear 53. Therefore the structure prevents the slide gear 53 from being damaged, deformed or the like, and enables the slide gear 53 to be used for a long time stably.

When the slide gear 53 and the reduction gear 43 are in the power non-transmission state, the opening/closing door 26 is open and the side face of the right side of the apparatus housing is open, and the back-side portion of the fixing unit 30 and the inside of the transport path 25 are exposed to the outside. This enables a recording sheet S stuck in the fixing nip in the fixing unit 30 to be pulled down.

In this state, since the slide gear 53 is in the power non-transmission state where it has been released from the meshing state with the reduction gear 43, the power transmission shaft 52, to which the slide gear 53 has been attached, can rotate freely without restriction imposed by the reduction gear 43. Thus, the docking gear 51 attached to the power transmission shaft 52, the fixing-side intermediate gear 37 meshing with the docking gear 51, and the fixing input gear 36 meshing with the fixing-side intermediate gear 37 can also rotate freely. Furthermore, the rotational shaft 34b and the roller body 34a of the pressing roller 34 can rotate freely.

In this state, when the recording sheet S stuck in the fixing nip is pulled down, the roller body 34a can rotate freely following the recording sheet S that is being pulled down from the fixing nip. This enables the recording sheet S to be pulled down smoothly with little resistive force from the fixing nip.

In this case, since there is a gap between the slide gear 53, which is attached to the power transmission shaft 52, and each of the front-side contact part 54Y and the back-side contact part 54Z, there is no possibility that a force, which may become a load against the rotation of the pressing roller 34, may be applied from the front-side contact part 54Y and the back-side contact part 54Z to the slide gear 53 when the recording sheet S is pulled down. This further reduces the resistive force from the fixing nip, preventing the recording sheet S from being torn apart when it is pulled down from the fixing nip. Accordingly, this structure eliminates the possibility that the fragments of the recording sheet S may remain in the fixing nip.

Note that, when the slide gear 53 is rotating, the front-side face and the back-side face of the slide gear 53 are in contact respectively with the outer circumferential faces of the front-side contact part 54Y and the back-side contact part 54Z which are in the shape of semicylinder. With this structure, the contact area between the slide gear 53 and each of the front-side contact part 54Y and the back-side contact part 54Z is small, and the frictional force applied to the slide gear 53 from each of the front-side contact part 54Y and the back-side contact part 54Z is small as well. This restricts the slide gear 53 from wearing due to contacts with the front-side contact part 54Y and the back-side contact part 54Z.

The following explains the relationship between the slide gear 53 and the switch lever 54 with reference to FIGS. 14A and 14B. In FIG. 14A illustrating the power transmission state in which the slide gear 53 meshes with the reduction gear 43, the sign "Lt" denotes a thickness of a portion of the slide gear 53 that passes through between the front-side contact part 54Y and the back-side contact part 54Z (the length of the slide gear 53 along the power transmission shaft 52).

Also, the sign "La" denotes a distance from the rotational axis Oc of the switch lever 54 to the back-side center axis Oa which is the center axis of the circuit with radius "r" in the back-side contact part 54Z, and the sign "Lb" denotes a distance from the rotational axis Oc to the front-side center axis Ob which is the center axis of the circuit with radius "r" in the front-side contact part 54Y. Furthermore, the sign "α" denotes an angle (acute angle) that is formed by two straight lines: a straight line that connects the rotational axis Oc and the back-side center axis Oa; and a straight line that connects the rotational axis Oc and the front-side center axis Ob.

Furthermore, as illustrated in FIG. 14A, the sign "ω" denotes an angle that is formed by: the straight line that connects the rotational axis Oc and the back-side center axis Oa; and the reference line HL on the upper face 54b (horizontal plane) that passes the rotational axis Oc of the switch lever 54, when the slide gear 53 and the reduction gear 43 are in the power transmission state, and the back-side contact part 54Z contacts the back-side face of the slide gear 53. Also, in such a power transmission state, the sign "Lc" denotes a distance (the shortest distance) between the front-side contact part 54Y and the back-side contact part 54Z, and the sign "Ld" denotes a distance (the shortest distance) between the slide gear 53 and the front-side contact part 54Y.

Furthermore, in FIG. 14B illustrating the power non-transmission state in which the switch lever 54 has moved rotationally and the slide gear 53 has been released from the meshing state with the reduction gear 43, the sign "θ" denotes a rotational angle for a rotational move of the back-side contact part 54Z from the position illustrated in FIG. 14A (a rotational angle of the switch lever 54), the sign "Lx" denotes an amount of slide of the slide gear 53 from the position illustrated in FIG. 14A, the sign "Le" denotes a distance (the shortest distance) between the front-side contact part 54Y and the back-side contact part 54Z, and the sign "Lf" denotes a distance (the shortest distance) between the slide gear 53 and the front-side contact part 54Y. Note that, when the slide gear 53 is in the power non-transmission state, the back-side contact part 54Z moves rotationally to a position that is more on the front side than the reference line HL, by the rotation of the switch lever 54 (θ−ω>0).

In this case, the following equations (1), (2) and (3) represent the amount Lx of slide of the slide gear 53, the distance (the shortest distance) Lc between the front-side contact part 54Y and the back-side contact part 54Z, and the distance (the shortest distance) Le between the front-side contact part 54Y and the back-side contact part 54Z, respectively.

$$Lx = La \cdot \sin\omega + La \cdot \sin(\theta - \omega) - 2r \tag{1}$$

$$Lc = La \cdot \sin\omega + Lb \cdot \sin(\alpha - \omega) - 2r \tag{2}$$

$$Le = Lb \cdot \sin(\alpha + \theta - \omega)\omega) - La \cdot \sin(\theta - \omega) - 2r \tag{3}$$

Also, "Lc−Lt>0" and "Le−Lt>0" are true since "Lc=Lt+Ld", "Le=Lt+Lf" and "Ld>0", "Lf>0", and this renders the following equations (4) and (5) true.

$$Lc - Lt = La \cdot \sin\omega + Lb \cdot \sin(\alpha - \omega) - 2r - Lt > 0 \tag{4}$$

$$Le - Lt = Lb \cdot \sin(\alpha + \theta - \omega) - La \cdot \sin(\theta - \omega) - 2r - Lt > 0 \tag{5}$$

Accordingly, to render the equations (4) and (5) true, values are set for the thickness Lt of the slide gear 53 located between the front-side contact part 54Y and the back-side contact part 54Z, the distance La from the rotational axis Oc to the back-side center axis Oa, the distance Lb from the rotational axis Oc to the front-side center axis Ob, the radius r of the circumferential faces of the front-side contact part 54Y and the back-side contact part 54Z, the rotational angle α of the switch lever 54 and the like.

Note that, when both the front-side contact part 54Y and the back-side contact part 54Z contact the slide gear 53 to cause the slide gear 53 to slide, the slide gear 53 receives pressures from both the front-side contact part 54Y and the back-side contact part 54Z. In order for the resistive force, which is generated due to the friction between the slide gear 53 and the power transmission shaft 52 which is generated by the pressures therefrom, to be made as small as possible, it is preferable that tracks TL overlap with the shaft center line CL of the power transmission shaft 52, wherein the tracks TL are tracks that are drawn by contact points between the slide gear 53 and the front-side contact part 54Y and the back-side contact part 54Z from the start to the end of the rotational move of the switch lever 54 in correspondence with from the start to the end of switching between the power transmission state and the power non-transmission state (FIG. 14B illustrates only a track of the back-side contact part 54Z). That is to say, it is preferable that the track TL is slanted from the vertical plane including the shaft center line CL of the power transmission shaft 52, and the angle of the slant is small, and the distance between each track TL and the shaft center line CL of the power transmission shaft 52 is small and each track TL is close to the shaft center line CL.

It is therefore preferable that the distances between the tracks TL and the shaft center line CL are within a predetermined range. In order for the distances between the tracks TL and the shaft center line CL to be within a predetermined range, the positions of the front-side contact part 54Y and the back-side contact part 54Z and the position of the supporting axis of the holding member 54X are determined.

With this structure, with regard to a pressing force that is applied from the front-side contact part 54Y and the back-side contact part 54Z when the slide gear 53 slides, a component of the pressing force that acts along a direction perpendicular to the shaft center line CL of the power transmission shaft 52 is small, and a component of the pressing force that acts along the shaft center line CL of the power transmission shaft 52 is large.

This restricts the slide gear 53 from being slanted largely relative to the power transmission shaft 52, and thus restricts application of a large frictional force to between the slide gear 53 and the power transmission shaft 52 when the slide gear 53 slides, enabling the slide gear 53 to slide smoothly. Furthermore, the above structure reduces the amount of slide of the contact position between the slide gear 53 and each of the front-side contact part 54Y and the back-side contact part 54Z when the slide gear 53 slides, and can restricts the wear, deformation, damage and the like of the slide gear 53.

Figure 15A:
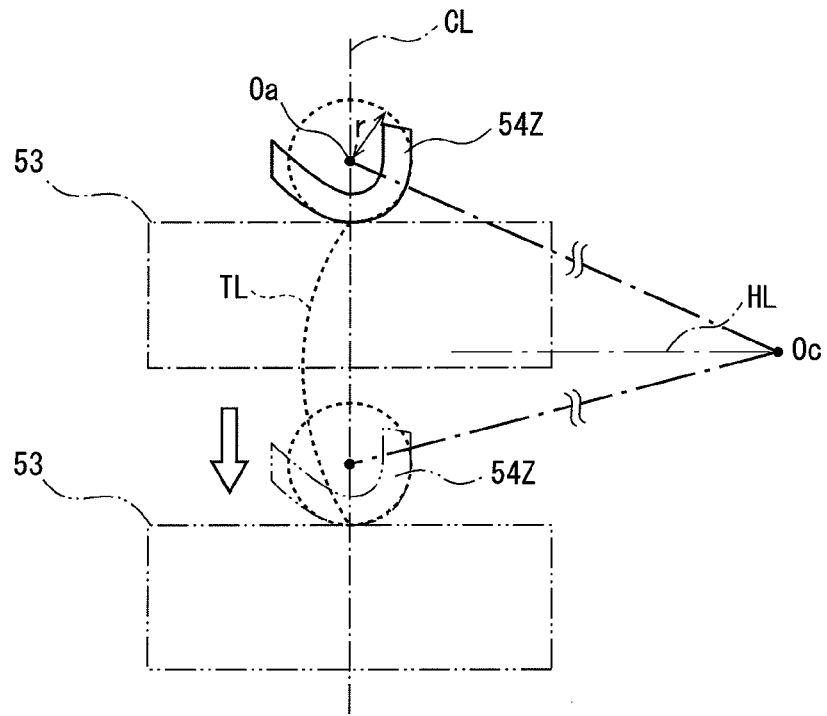
FIG. 15A is a schematic diagram for explanation of suitable relationship between the slide gear and the back-side contact part of the switch lever.
Figure 15B:
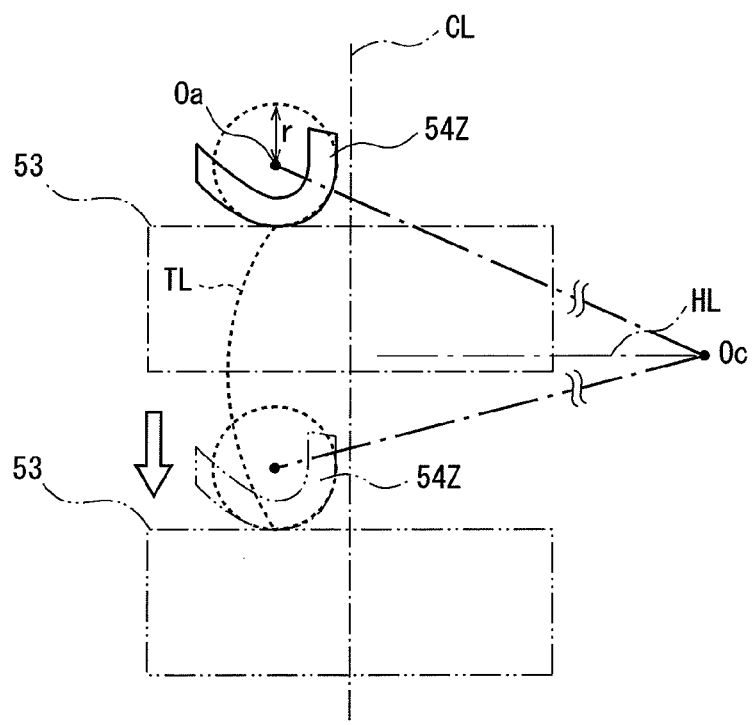
FIG. 15B is a schematic diagram for explanation of relationship between a slide gear and a back-side contact part in a comparative example.

FIG. 15A is a schematic diagram viewing from a direction of the supporting axis of the holding member 54X (plan views) for explanation of suitable relationship between the slide gear 53 and the back-side contact part 54Z of the switch lever 54. FIG. 15B is a schematic diagram viewing from a direction of the supporting axis of the holding member 54X (plan views) for explanation of relationship between a slide gear and a back-side contact part in a comparative example.

In order to reduce a pressure that acts from the back-side contact part 54Z to the reduction gear 43 in a direction perpendicular to the shaft center line CL of the power transmission shaft 52 when the slide gear 53 is slid by the rotational move of the switch lever 54, it is preferable, as illustrated in FIG. 15A, that, viewing from a direction of the supporting axis of the holding member 54X, a position of contact between the slide gear 53 and the holding member 54X is on the shaft center line CL of the power transmission shaft 52 at both the start and end of switching between the power transmission state and the power non-transmission state, namely, the position of contact is on a vertical plane including the shaft center line CL.

This structure makes it possible to reduce a moment that is applied around the shaft center line CL of the power transmission shaft 52 by a pressure applied from the back-side contact part 54Z to the slide gear 53 when the switch lever 54 moves rotationally. This reduces a frictional force generated between the slide gear 53 and the power transmission shaft 52.

FIG. 15B illustrates a case where a position of contact between the slide gear 53 and the back-side contact part 54Z is separated from the vertical plane including the shaft center line CL of the power transmission shaft 52 toward a direction opposite to the rotational axis Oc of the switch lever 54, for each of the cases where the slide gear 53 and the reduction gear 43 are in the power transmission state and the power non-transmission state.

In the comparative example, the moment that is applied from the back-side contact part 54Z to the slide gear 53 when the switch lever 54 moves rotationally (the moment that is applied around the shaft center line CL of the power transmission shaft 52) is larger than the moment in the case illustrated in FIG. 15A. In this state, there is a possibility that the slide gear 53 may be slanted relative to the power transmission shaft 52 and a frictional force generated between the slide gear 53 and the power transmission shaft 52 may be increased.

Also, in this case, a position of a pressure applied to the slide gear 53 is separated from the rotational axis Oc of the switch lever 54, and thus the moment around the rotational axis Oc of the switch lever 54 is larger than the moment in the case illustrated in FIG. 15A.

Note that, similarly, in each of the cases where the slide gear 53 and the reduction gear 43 are in the power transmission state and the power non-transmission state, when the position of contact between the slide gear 53 and the back-side contact part 54Z is separated from the vertical plane including the shaft center line CL of the power transmission shaft 52 toward the rotational axis Oc of the switch lever 54, the moment that is applied from the back-side contact part 54Z to the slide gear 53 (the moment that is applied around the shaft center line CL of the power transmission shaft 52) is larger than the moment in the case illustrated in FIG. 15A, and thus the frictional force generated between the slide gear 53 and the power transmission shaft 52 is increased. This applies to the front-side contact part 54Y as well.

<Modifications>

In the above embodiment, power transmission between the power transmission shaft 52 and the fixing unit 30 is always in the power transmission state, and the power transmission between the power transmission shaft 52 and the drive unit 40 is switched between the power transmission state and the power non-transmission state. However, not limited to this structure, power transmission between the power transmission shaft 52 and the drive unit 40 may be always in the power transmission state, and the power transmission between the power transmission shaft 52 and the fixing unit 30 may be switched between the power transmission state and the power non-transmission state. In this case, the slide gear 53 is attached to the intermediate supporting shaft 38 in a slidable manner, and a gear is attached to the power transmission shaft 52 to mesh with the reduction gear 43.

Also, in the above embodiment, the slide gear 53 is switched between the power transmission state and the power non-transmission state by the rotational move of the switch lever 54. However, not limited to this structure, the switch lever 54 may be slid along the power transmission shaft 52 to switch the slide gear 53 between the power transmission state and the power non-transmission state.

Furthermore, in the above embodiment, when the restriction of the rotational move of the switch lever 54 by the engagement projection 26a is removed, the rotational move of the switch lever 54 continues until the urging force of the coil spring 55 is completely released. However, not limited to this structure, a stopper or the like may be used to restrict the rotational move of the switch lever 54 to a predetermined position. Alternatively, a stopper or the like for stopping the slide gear 53 from sliding may be provided to restrict the rotational move of the switch lever 54. In this structure where a stopper or the like is used to stop the slide gear 53 from sliding, since the slide gear 53 does not rotate, the load applied to the slide gear 53 from the stopper or the like is light and does not become a particular problem.

Furthermore, in the above embodiment, the switch lever 54 moves rotationally along a horizontal plane. However, not limited to this structure, the switch lever 54 may move rotationally along a plane that is parallel to the power transmission shaft 52. Also, the switch lever 54, not limited to the rotational moving, may slide along a slide axis.

The switch lever 54 is not limited to the shape described in the above embodiment, but may have any shape in so far as it is moved when contacted by the engagement projection 26a.

Also, the outer-circumference edges of the side faces of the slide gear 53 may be chamfered. With this structure, it is possible to prevent the front-side contact part 54Y and the back-side contact part 54Z from contacting the teeth of the slide gear 53.

Furthermore, in the above embodiment, it is described that the sheet transport device transports a recording sheet to pass through a fixing nip formed between the fixing belt 33 and the pressing roller 34 of the fixing unit 30 that are pressing each other. However, the present invention is not limited to this structure. For example, instead of the pressing roller 34 of the fixing unit 30, a heating roller may be used to form the fixing nip.

Furthermore, the present invention can be applied to a structure where a sheet is passed through a nip that is formed by the photosensitive drum 11 and the transfer roller 15 and to a structure where a sheet is passed through a nip that is formed by a pair of timing rollers 23. Also, the nip, through which the sheet is transported, may be formed by pressure members that do not rotate and are respectively pressed against rotational members such as rollers.

In the above embodiment, the slide gear 53 is used in the power transmission mechanism 50 to transmit the rotational power. However, not limited to this structure, a rotational member such as a timing belt, a sprocket or the like may be used to transmit the rotational power.

The image forming apparatus of the present invention is not limited to an image forming apparatus for monochrome images that is provided with only one developing device, but may be a tandem color digital printer which is provided with four image forming units disposed along an intermediate transfer belt that moves in a circulating motion, or may be a so-called 4-cycle image forming apparatus in which four developing devices are disposed around a rotational shaft, and a full-color image is formed by causing the four developing devices to face an electrostatic latent image holder in sequence. Furthermore, the structure of the present invention can be applied not only to a printer, but to a copier, a fax machine, an MFP (Multiple Function Peripheral) or the like.

Summary of Embodiment

According to an image forming apparatus of the present embodiment, the first contact part and the second contact part of the holding member sandwich the second rotation transmitting member loosely from both sides. Thus there is no possibility that the second rotation transmitting member receives a large pressure from the first contact part and the second contact part when the second rotation transmitting member is in the power transmission state. This prevents the second rotation transmitting member from being worn, deformed or the like by the pressure from the first contact part and the second contact part. Thus, with this structure, switching between the power transmission state and the power non-transmission state can be performed for a long period stably.

Also there is no possibility that the second rotation transmitting member receives a large pressure during the switching between the power transmission state and the power non-transmission state. This makes it possible to move stably the second rotation transmitting member relative to the first rotational shaft. This prevents the second rotational shaft from being worn, deformed or the like by the switching between the power transmission state and the power non-transmission state. Thus, with this structure, switching between the power transmission state and the power non-transmission state can be performed for a long period stably.

As described above, the present invention is useful as a technology for using the power transmission mechanism for a long period stably in an image forming apparatus provided with a sheet transport device.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image forming apparatus comprising a sheet transport device that transports a sheet through a nip, which is formed between a pressing member and a drive member, by applying a rotational force to the drive member via a power transmission mechanism, the power transmission mechanism including:
a first rotational shaft connected to the drive member;
a second rotational shaft connected to a drive source;
a first rotation transmitting member attached to one of the first rotational shaft and the second rotational shaft;
a second rotation transmitting member attached to the other of the first rotational shaft and the second rotational shaft;
a holding member including a first contact part and a second contact part that are disposed on opposite sides of the second rotation transmitting member along an axial direction of the second rotation transmitting member, sandwiching the second rotation transmitting member loosely from both of the sides; and
a rotational move member configured to switch to a power non-transmission state by moving the holding member rotationally to a first position in conjunction with an opening operation of an opening/closing member of an apparatus housing, and switch to a power transmission state by moving the holding member rotationally to a second position in conjunction with a closing operation of the opening/closing member,
the power non-transmission state being a state in which power is not transmitted between the first rotational shaft and the second rotational shaft, and the power transmission state being a state in which power is transmitted between the first rotational shaft and the second rotational shaft,
the rotational move member moving the holding member rotationally to the first position by causing the first contact part to contact and move the second rotation transmitting member toward a first direction, and moving the holding member rotationally to the second position by causing the second contact part to contact and move the second rotation transmitting member toward a second direction;
an outer circumferential face of each of the first contact part and the second contact part is, at least in a range to contact the second rotation transmitting member between a start and an end of switching between the power transmission state and the power non-transmission state while the holding member moves rotationally, in a shape of a side face of a cylinder whose center axis is parallel to the supporting axis of the holding member.

2. The image forming apparatus of claim 1, wherein
the second rotation transmitting member is slidable along the other of the first rotational shaft and the second rotational shaft to which the second rotation transmitting member is attached,
the holding member is configured to move rotationally in a plane that is parallel to the rotational shaft to which the second rotation transmitting member is attached, and
the rotational move member is configured to switch between the power transmission state and the power non-transmission state by causing the holding member to rotate around a supporting axis such that the first contact part and the second contact part move rotationally.

3. An image forming apparatus comprising a sheet transport device that transports a sheet through a nip, which is formed between a pressing member and a drive member, by applying a rotational force to the drive member via a power transmission mechanism,
the power transmission mechanism including:
a first rotational shaft connected to the drive member;
a second rotational shaft connected to a drive source;
a first rotation transmitting member attached to one of the first rotational shaft and the second rotational shaft;
a second rotation transmitting member attached to the other of the first rotational shaft and the second rotational shaft;
a holding member including a first contact part and a second contact part that are disposed on opposite sides of the second rotation transmitting member along an axial direction of the second rotation transmitting member, sandwiching the second rotation transmitting member loosely from both of the sides; and
a rotational move member configured to switch to a power non-transmission state by moving the holding member rotationally to a first position in conjunction with an opening operation of an opening/closing member of an apparatus housing, and switch to a power transmission state by moving the holding member rotationally to a second position in conjunction with a closing operation of the opening/closing member,
the power non-transmission state being a state in which power is not transmitted between the first rotational shaft and the second rotational shaft, and the power transmission state being a state in which power is transmitted between the first rotational shaft and the second rotational shaft,
the rotational move member moving the holding member rotationally to the first position by causing the first contact part to contact and move the second rotation transmitting member toward a first direction, and moving the holding member rotationally to the second position by causing the second contact part to contact and move the second rotation transmitting member toward a second direction;
when view from a direction of the supporting axis of the holding member,
positions of the first contact part and the second contact part and a position of the supporting axis of the holding member are determined such that distances between tracks, which are drawn by contact points between the second rotation transmitting member and the first contact part and the second contact part from the start to the end of switching between the power transmission state and the power non-transmission state, and the center axis of the rotational shaft to which the second rotation transmitting member is attached are within a predetermined range.

4. The image forming apparatus of claim 3, wherein
when viewed from the direction of the supporting axis of the holding member,
the tracks drawn by the contact points intersect with the center axis of the rotational shaft to which the second rotation transmitting member is attached.

5. The image forming apparatus of claim 3, wherein
when viewed from the direction of the supporting axis of the holding member,
positions of the contact points between the second rotation transmitting member and the first contact part and the second contact part at the start and the end of switching between the power transmission state and the power non-transmission state overlap with the center axis of the rotational shaft to which the second rotation transmitting member.

6. The image forming apparatus of claim 1, wherein
the rotational move member includes:
an urging part that urges the holding member toward the first position; and
an engagement projection provided in the opening/closing member and configured to, in conjunction with the closing operation of the opening/closing member, engage with and move the holding member to the second position, resisting an urging force of the urging part.

7. The image forming apparatus of claim 1, wherein
the power transmission mechanism is configured to transmit power between the first rotational shaft and the second rotational shaft via two or more gears, and the second rotation transmitting member is one of the two or more gears that is attached to the first rotational shaft or the second rotational shaft.

8. The image forming apparatus of claim 1, wherein
the drive member is a heating rotational member or a pressing rotational member provided in a fixing unit.

9. A power transmission mechanism comprising:
a first rotational shaft connected to the drive member;
a second rotational shaft connected to a drive source;
a first rotation transmitting member attached to one of the first rotational shaft and the second rotational shaft;
a second rotation transmitting member attached to the other of the first rotational shaft and the second rotational shaft;
a holding member including a first contact part and a second contact part that are disposed on opposite sides of the second rotation transmitting member along an axial direction of the second rotation transmitting member, sandwiching the second rotation transmitting member loosely from both of the sides; and
a rotational move member configured to switch between a power transmission state in which power is transmitted between the first rotational shaft and the second rotational shaft, and a power non-transmission state in which power is not transmitted between the first rotational shaft and the second rotational shaft, by moving the holding member rotationally and causing one of the first contact part and the second contact part to contact and move the second rotation transmitting member to a first position or to a second position,
an outer circumferential face of each of the first contact part and the second contact part is, at least in a range to contact the second rotation transmitting member between a start and an end of switching between the power transmission state and the power non-transmission state while the holding member moves rotationally, in a shape of a side face of a cylinder whose center axis is parallel to the supporting axis of the holding member.

10. The power transmission mechanism of claim 9, wherein
the second rotation transmitting member is slidable along the other of the first rotational shaft and the second rotational shaft to which the second rotation transmitting member is attached,
the holding member is configured to move rotationally in a plane that is parallel to the rotational shaft to which the second rotation transmitting member is attached, and
the rotational move member is configured to switch between the power transmission state and the power non-transmission state by causing the holding member to rotate around a supporting axis such that the first contact part and the second contact part move rotationally.

11. A power transmission mechanism comprising:
a first rotational shaft connected to the drive member;
a second rotational shaft connected to a drive source;
a first rotation transmitting member attached to one of the first rotational shaft and the second rotational shaft;
a second rotation transmitting member attached to the other of the first rotational shaft and the second rotational shaft;
a holding member including a first contact part and a second contact part that are disposed on opposite sides of the second rotation transmitting member along an axial direction of the second rotation transmitting member, sandwiching the second rotation transmitting member loosely from both of the sides:
a rotational move member configured to switch between a power transmission state in which power is transmitted between the first rotational shaft and the second rotational shaft, and a power non-transmission state in which power is not transmitted between the first rotational shaft and the second rotational shaft, by moving the holding member rotationally and causing one of the first contact part and the second contact part to contact and move the second rotation transmitting member to a first position or to a second position;
wherein when viewed from a direction of the supporting axis of the holding member, positions of the first contact part and the second contact part and a position of the supporting axis of the holding member are determined such that distances between tracks, which are drawn by contact points between the second rotation transmitting member and the first contact part and the second contact part from the start to the end of switching between the power transmission state and the power non-transmission state, and the center axis of the rotational shaft to which the second rotation transmitting member is attached are within a predetermined range.

12. The power transmission mechanism of claim 11, wherein
when viewed from the direction of the supporting axis of the holding member,
the tracks drawn by the contact points intersect with the center axis of the rotational shaft to which the second rotation transmitting member is attached.

13. The power transmission mechanism of claim 11, wherein
when viewed from the direction of the supporting axis of the holding member,
positions of the contact points between the second rotation transmitting member and the first contact part and the second contact part at the start and the end of switching between the power transmission state and the power non-transmission state overlap with the center axis of the rotational shaft to which the second rotation transmitting member.

14. The power transmission mechanism of claim 9, wherein
the rotational move member, in conjunction with an opening operation of an opening/closing member, moves the holding member to the first position, leading to the power non-transmission state in which power is not transmitted between the first rotational shaft and the second rotational shaft, and in conjunction with a closing operation of the opening/closing member, moves the holding member to the second position, leading to the power transmission state in which power is transmitted between the first rotational shaft and the second rotational shaft.

15. The power transmission mechanism of claim 14, wherein
the rotational move member includes:
an urging part that urges the holding member toward the first position; and
an engagement projection provided in the opening/closing member and configured to, in conjunction with the closing operation of the opening/closing member, engage with and move the holding member to the second position, resisting an urging force of the urging part.

16. The power transmission mechanism of claim 9, wherein
the power transmission mechanism is configured to transmit power between the first rotational shaft and the second rotational shaft via two or more gears, and the second rotation transmitting member is one of the two or more gears that is attached to the first rotational shaft or the second rotational shaft.

* * * * *